(12) United States Patent
Beeson

(10) Patent No.: US 7,490,239 B2
(45) Date of Patent: Feb. 10, 2009

(54) FACILITATING DIGITAL SIGNATURE BASED ON EPHEMERAL PRIVATE KEY

(75) Inventor: Curtis Linn Beeson, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 750 days.

(21) Appl. No.: 11/161,566

(22) Filed: Aug. 8, 2005

(65) Prior Publication Data

US 2006/0156012 A1 Jul. 13, 2006

Related U.S. Application Data

(60) Provisional application No. 60/641,958, filed on Jan. 7, 2005, provisional application No. 60/641,957, filed on Jan. 7, 2005.

(51) Int. Cl.
*G06F 9/00* (2006.01)
(52) U.S. Cl. .................. 713/176; 713/182; 713/189
(58) Field of Classification Search ............... 713/176, 713/182, 189
See application file for complete search history.

(56) References Cited

U.S. PATENT DOCUMENTS

| | | | |
|---|---|---|---|
| 3,962,539 | A | 6/1976 | Ehrsam et al. |
| 4,200,770 | A | 4/1980 | Hellman et al. |
| 4,218,582 | A | 8/1980 | Hellman et al. |
| 4,405,829 | A | 9/1983 | Rivest et al. |
| 4,408,203 | A | 10/1983 | Campbell |
| 4,424,414 | A | 1/1984 | Hellman et al. |
| 4,748,668 | A | 5/1988 | Shamir et al. |
| 4,797,920 | A | 1/1989 | Stein |
| 4,823,388 | A | 4/1989 | Mizutani et al. |
| 4,825,050 | A | 4/1989 | Griffith et al. |
| 4,850,017 | A | 7/1989 | Matyas, Jr. et al. |
| 4,868,877 | A | 9/1989 | Fischer |
| 5,001,752 | A | 3/1991 | Fischer |

(Continued)

FOREIGN PATENT DOCUMENTS

CA 2271178 5/1999

(Continued)

OTHER PUBLICATIONS

PCKS #9, Selected Object Classes and Attribute Types Version 2.0, RSA Laboratories, Redwood City, CA, pp. 1-42, Nov. 1, 2000.

(Continued)

*Primary Examiner*—Thomas R Peeso
(74) *Attorney, Agent, or Firm*—Sutherland Asbill & Brennan LLP

(57) ABSTRACT

Facilitating communication using a digital signature includes: receiving user input data (UID); generating a first key as a deterministic function of the UID; clearing the UID; generating a second key as a deterministic function of the first key; clearing the first key following generation of the second key; and exporting the second key. Neither the UID nor the first key is exported. Thereafter, a digital signature is generated by again receiving the UID; regenerating the first key using the deterministic function and the UID; clearing the UID; generating a digital signature as a function of the regenerated first key; clearing the regenerated first key following generation of the digital signature; and exporting the generated digital signature.

46 Claims, 13 Drawing Sheets

U.S. PATENT DOCUMENTS

| | | | |
|---|---|---|---|
| 5,018,196 | A | 5/1991 | Takaragi |
| 5,029,208 | A | 7/1991 | Tanaka |
| 5,140,634 | A | 8/1992 | Guillou et al. |
| 5,231,668 | A | 7/1993 | Kravitz |
| 5,422,953 | A | 6/1995 | Fischer |
| 5,455,865 | A | 10/1995 | Perlman |
| 5,502,766 | A | 3/1996 | Boebert et al. |
| 5,539,828 | A | 7/1996 | Davis |
| 5,563,946 | A | 10/1996 | Cooper et al. |
| 5,604,801 | A | 2/1997 | Dolan et al. |
| 5,615,266 | A | 3/1997 | Altschuler |
| 5,615,268 | A | 3/1997 | Bisbee et al. |
| 5,623,637 | A | 4/1997 | Jones et al. |
| 5,636,280 | A | 6/1997 | Kelly |
| 5,659,616 | A | 8/1997 | Sudia |
| 5,671,279 | A | 9/1997 | Elgamal |
| 5,671,285 | A | 9/1997 | Newman |
| 5,677,953 | A | 10/1997 | Dolphin |
| 5,694,471 | A | 12/1997 | Chen et al. |
| 5,721,779 | A | 2/1998 | Funk |
| 5,751,813 | A | 5/1998 | Dorenbos |
| 5,778,072 | A | 7/1998 | Samar |
| 5,787,172 | A | 7/1998 | Arnold |
| 5,790,677 | A | 8/1998 | Fox et al. |
| 5,796,840 | A | 8/1998 | Davis |
| 5,809,144 | A | 9/1998 | Sirbu et al. |
| 5,812,666 | A | 9/1998 | Baker et al. |
| 5,825,884 | A | 10/1998 | Zdepski et al. |
| 5,848,161 | A | 12/1998 | Luneau et al. |
| 5,870,475 | A | 2/1999 | Allan et al. |
| 5,878,142 | A | 3/1999 | Caputo et al. |
| 5,883,810 | A | 3/1999 | Franklin et al. |
| 5,887,131 | A | 3/1999 | Angelo |
| 5,910,989 | A | 6/1999 | Naccache |
| 5,943,423 | A | 8/1999 | Muftic |
| 5,949,881 | A | 9/1999 | Davis |
| 5,956,404 | A | 9/1999 | Schneier |
| 5,963,648 | A | 10/1999 | Rosen |
| 5,970,147 | A | 10/1999 | Davis |
| 6,009,177 | A | 12/1999 | Sudia |
| 6,021,202 | A | 2/2000 | Anderson et al. |
| 6,023,509 | A | 2/2000 | Herbert et al. |
| 6,044,154 | A | 3/2000 | Kelly |
| 6,061,794 | A | 5/2000 | Angelo et al. |
| 6,061,799 | A | 5/2000 | Eldridge et al. |
| 6,070,154 | A | 5/2000 | Tavor et al. |
| 6,073,242 | A | 6/2000 | Hardy et al. |
| 6,084,969 | A | 7/2000 | Wright et al. |
| 6,092,202 | A | 7/2000 | Veil et al. |
| 6,102,287 | A | 8/2000 | Matyas et al. |
| 6,104,815 | A | 8/2000 | Alcorn et al. |
| 6,105,012 | A | 8/2000 | Chang et al. |
| 6,111,956 | A | 8/2000 | Field et al. |
| 6,134,325 | A | 10/2000 | Vanstone et al. |
| 6,154,543 | A | 11/2000 | Baltzley |
| 6,161,180 | A | 12/2000 | Matyas et al. |
| 6,161,181 | A | 12/2000 | Haynes et al. |
| 6,167,518 | A | 12/2000 | Padgett et al. |
| 6,189,096 | B1 | 2/2001 | Haverty |
| 6,192,130 | B1 | 2/2001 | Otway |
| 6,199,052 | B1 | 3/2001 | Mitty et al. |
| 6,202,151 | B1 | 3/2001 | Musgrave et al. |
| 6,213,391 | B1 | 4/2001 | Lewis |
| 6,230,269 | B1 | 5/2001 | Spies et al. |
| 6,243,812 | B1 | 6/2001 | Matyas et al. |
| 6,253,027 | B1 | 6/2001 | Weber et al. |
| 6,263,447 | B1 | 7/2001 | French et al. |
| 6,279,112 | B1 | 8/2001 | O'Toole Jr, et al. |
| 6,282,522 | B1 | 8/2001 | Davis et al. |
| 6,285,991 | B1 | 9/2001 | Powar |
| 6,299,062 | B1 | 10/2001 | Hwang |
| 6,314,519 | B1 | 11/2001 | Davis et al. |
| 6,324,525 | B1 | 11/2001 | Kramer et al. |
| 6,373,950 | B1 | 4/2002 | Rowney |
| 6,510,516 | B1 | 1/2003 | Benson et al. |
| 6,523,067 | B2 | 2/2003 | Mi et al. |
| 6,532,451 | B1 | 3/2003 | Schell et al. |
| 6,565,000 | B2 | 5/2003 | Sehr |
| 6,571,339 | B1 | 5/2003 | Danneels et al. |
| 6,587,837 | B1 | 7/2003 | Spagna et al. |
| 6,594,633 | B1 | 7/2003 | Broerman |
| 6,618,483 | B1 | 9/2003 | Vanstone et al. |
| 6,671,805 | B1 | 12/2003 | Brown et al. |
| 6,704,870 | B2 | 3/2004 | Vanstone et al. |
| 2001/0000535 | A1 | 4/2001 | Lapsley et al. |
| 2002/0120846 | A1 | 8/2002 | Stewart |

FOREIGN PATENT DOCUMENTS

| | | |
|---|---|---|
| EP | 807911 | 11/1997 |
| WO | WO 99057835 | 11/1999 |

OTHER PUBLICATIONS

Digital Signature Guidelines Tutorial; ABA Network, (web site at http://www.abanet.org/scietech/ec/isc/dsg-tutorial.html), pp. 1-7, date of capture Feb. 18, 2003.

Gerck, Ed, Overview of Certification Systems: x.509, PKIX, CA, PGP & SKIP—Do you understand digital certificates? Do you know what they warrant? pp. 1-18, Jul. 18, 2000.

Linn, John, Trust Models and Management in Public-Key Infrastructures; RSA Laboratories, pp. 1-13, Nov. 6, 2000.

PKCS #5, v2.0: Password-Based Cryptography Standard, RSA Laboratories, Redwood City, CA; pp. 1-30, Mar. 25, 1999.

PKCS #9, v2.0: Selected Object Classes and Attribute Types, RSA Laboratories, Redwood City, CA; pp. 1-34, Feb. 25, 2000.

PKCS #10, v1.7: Certificate Request Syntax Standard, RSA Laboratories, Redwood City, CA; pp. 1-10, May 26, 2000.

PCKS #12, v1.0: Personal Information Exchange Syntax, RSA Laboratories, Redwood City, CA; pp. 1-23, Jun. 24, 1999.

PCKS #15: Conformance Profile Specification; RSA Laboratories, Redwood City, CA; pp. 1-8, Aug. 1, 2000.

Guide to Internet Security; Public Key Cryptography (web site at http://www.e-certify.com/library/pkc_guide.htm) captured on Feb. 18, 2003.

Cylink atm encryptor (web site at http//securitytools.hypermart.net/security_1/cylink_atm_encryptor.html), p. 1, date of cature Feb. 18, 2003.

BAL's PGP Public Key Server; The Computer Law Resource 1996; (web site at http://www.complaw.com/pgp/webkeyserver.html), pp. 1-2, date of capture Feb. 18, 2003.

Kaliski, Burton S., Jr., Some Examples of the PKCS Standards, An RSA Laboratories Technical Note, RSA Laboratories, Redwood City, CA., pp. 1-15, dated Nov. 1, 1993.

Kaliski, Burton S., Jr., A Layman's Guide to a Subset of ASN.1, BER, and DER, An RSA Laboratories Technical Note, RSA Laboratories, Redwood City, CA., pp. 1-36, dated Nov. 1, 1993.

PKCS Editor, PKCS #1 v2.1: RSA Cryptography Standard, RSA Laboratories, Draft 2, RSA Laboratories, Bedford, MA, pp. 1-60, dated Jan. 5, 2001.

PKCS #3: Diffie-Hellman Key-Agreement Standard, An RSA Laboratories Technical Note, Version 1.4, RSA Laboratories, Redwood City, CA. pp. 1-8, dated Nov. 1, 1993.

PKCS #6: Extended-Certificate Syntax Standard, An RSA Laboratories Technical Note, Version 1.5, RSA Laboratories, Redwood City, CA. pp. 1-11, dated Nov. 1, 1993.

PKCS #8: Private-Key Information Syntax Standard, An RSA Laboratories Technical Note, Version 1.2, RSA Laboratories, Redwood City, CA. pp. 1-5, dated Nov. 1, 1993.

Wiener, Michael J., Performance Comparison of Public-Key Cryptosystems, Technical Newsletter of RSA Laboratories, a div of RSA Data Security, Inc., vol. 4, No. 1, pp. 1-23, Summer 1998, date of capture Jun. 20, 2005.

Maurer, Ueli, Modeling a Public-Key Infrastructure, Dept. of Computer Science, Swiss Federal Institute of Technology, pp. 1-26, Sep. 1996.

Security Requirements for Cryptographic Modules, FIP Standards Pub. 140-1, Jan. 11, 1994 pp. 1-45, CSL Bulletin for FIPS 140-1 pp. 1-6, 2001/2000.

Heroux, Mark, A Private Key Storage Server for DCE—Functional Specification, Open Software Foundation Request for Comments; 94.1, (http://www.opengroup.org/rfc/mirror); Nov. 1996.

Answers to Frequently Asked Questions about Today's Cryptography, RSA Data Security, Inc., Revision 2.0, pp. 1-44, Oct. 5, 1993.

Announcing the Standard for Digital Signature Standard (DSS), Federal Information Processing Standards Publication 186, pp. 1-18, May 19, 1994.

"X9 Overview," American Bankers Association web page (web site at http://www.x9.org/aboutX9.htm), 1998, 3 pp, date of capture Jan. 11, 1999.

Kaliski, Burton S., Jr. An Overview of the PKCS Standards, RSA Laboratories Technical Note, RSA Data Security, Inc. Public-Key Cryptography Standards (PKCS), pp. 1-27, Nov. 1, 1993.

Public Key Cryptography, NIST Special Publication 800-2, reprinted at http://csrc.nist.gov/publications/nistpubs/800-2/800-2.txt), pp. 1-138, Apr. 1991.

Guideline for Implementing Cryptography in the Federal Government, NIST Special Publication 800-21, pp. 1-138, Nov. 1999.

Guideline for the Use of Advanced Authentication Technology Alternatives, FIPS Pub. 190, reprinted at http://csrc.nist.gov/publications/fips/fips190/fip190.txt), pp. 1-55, Sep. 28, 1994.

Security Requirements for Cryptographic Modules, FIPS Publication 140-2, pp. 1-62, May 25, 2001.

Secure Hash Standard, FIPS Publication 180-1, pp. 1-24, Apr. 17, 1995.

Digital Signature Standard (DSS), FIPS Publication 186-2, pp. 1-72, Jan. 27, 2000.

Entity Authentication Using Public Key Cryptography, FIPS Publication 196, pp. 1-52, Feb. 18, 1997.

Computer Data Authentication, FIPS Publication 113, (web site at www.itl.nist.gov/fipspubs/fip113.htm), pp. 1-7, date of capture Jan. 16, 2001.

Public Key Infrastructure, An NSS Group White Paper, by Bob Walder, undated, reprinted http://www.nss.co.uk/WhitePapers/PublicKeyInfrastructure.htm, pp. 1-18, data captured on on Jan. 25, 2001.

Understanding Public Key Infrastructure (PKI), Technology White Paper, by RSA Security, Inc., pp. 1-10, 1999.

"X9.59 Working Draft" ABA; American National Standard X9.59-199X, For the Financial Services Industry: Account-Based Secure Payment Objects, pp. 1-26, Sep. 25, 1998.

Wheeler, Lynn, Account Authority Digital Signature Model web page (web site at http:www.garlic.com/~lynn/aadsover.htm) believed available at website after Nov. 8, 1997, 5 pp, date of capture Oct. 2, 2001.

"How PGP Works," web pages from www.pgpi.org, containing basic information, data captured on May 6, 2004.

PGP Certificate Server, Total Network Security, Network Associates, 3965 Freedom Circle, Santa Clara, CA 95044-1203, dated Oct. 1999.

"PGP Desktop Security 7.0," PGP Security, 3965 Freedom Circle, Santa Clara, CA 95054-1203, dated Jul. 2000.

"Inside PGP Key Reconstruction: Technical Details," Revision by Will Price, A PGP Security, Inc. White Paper, dated Jul. 25, 2000.

Barwood, George "Elliptic curve cryptography FAQ v1.12, Dec. 22, 1997", http://www.cryptoman.com/elliptic.htm, date of capture Apr. 15, 2005, pp. 1-9.

FACILITATING DIGITAL SIGNATURE BASED ON EPHEMERAL PRIVATE KEY

CROSS REFERENCE TO RELATED APPLICATIONS

This application claims priority to U.S. Provisional Patent Application No. 60/641,958 filed Jan. 7, 2005 entitled "Soft Token: Passphrase Inventions," and U.S. Provisional Patent Application No. 60/641,957 filed Jan. 7, 2005 entitled "Soft Token: Offset Inventions," the disclosures of which are incorporated by reference herein in their entireties.

This application is also related to the following U.S. patent applications, the disclosures of which are incorporated by reference herein in their entireties:

1. U.S. patent application "ASYMMETRIC KEY CRYPTOSYSTEM BASED ON SHARED KNOWLEDGE" filed on Aug. 8, 2005;
2. U.S. patent application "PROVIDING DIGITAL SIGNATURE AND PUBLIC KEY BASED ON SHARED KNOWLEDGE" filed on Aug. 8, 2005;
3. U.S. patent application "VERIFYING DIGITAL SIGNATURE BASED ON SHARED KNOWLEDGE" filed on Aug. 8, 2005;
4. U.S. patent application "DIGITAL SIGNATURE SYSTEM BASED ON SHARED KNOWLEDGE" filed on Aug. 8, 2005;
5. U.S. patent application "SOFTWARE FOR PROVIDING BASED ON SHARED KNOWLEDGE PUBLIC KEYS HAVING SAME PRIVATE KEY" filed on Aug. 8, 2005;
6. U.S. patent application "PROVIDING CRYPTOGRAPHIC KEY BASED ON USER INPUT DATA" filed on Aug. 8, 2005;
7. U.S. patent application "GENERATING PUBLIC-PRIVATE KEY PAIR BASED ON USER INPUT DATA" filed on Aug. 8, 2005;
8. U.S. patent application "GENERATING DIGITAL SIGNATURES USING EPHEMERAL CRYPTOGRAPHIC KEY" filed on Aug. 8, 2005;
9. U.S. patent application "DIGITAL SIGNATURE SOFTWARE USING EPHEMERAL PRIVATE KEY AND SYSTEM" filed On Aug. 8, 2005.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

TECHNICAL FIELD

The present invention relates generally to cryptosystems and cryptography, and relates more particularly to methods involving aspects of deterministic functions in elliptic curve cryptography (ECC) in connection with authentication, digital signatures, and security of electronic communications including electronic financial transactions, and still more particularly to aspects of providing additional security by use of a data string or "passphrase" in an an ECC deterministic function.

BACKGROUND OF THE INVENTION

A cryptosystem is a method of disguising messages so that only certain people can see through the disguise and interpret the message. Cryptography is the art and science of creating and using cryptosystems. Cryptosystems and cryptography are often used in connection with the conduct of electronic transactions and communications such as, for example, electronic financial transactions. Basically, a cryptosystem involves the generation of an encryption key that is used to encrypt a message; only a person that has a corresponding decryption key can decipher the message.

There are two principal types of cryptosystems: symmetric and asymmetric. Symmetric cryptosystems use the same key (a secret key) to encrypt and decrypt the message. Asymmetric cryptosystems use one key (for example a public key) to encrypt a message and a different key (a private key) to decrypt the message. Asymmetric cryptosystems are also called "public key" or "public key/private key" cryptosystems.

Symmetric cryptosystems have the following inherent problem: how does one transport the secret key from the send of a message to the recipient securely and in a tamperproof fashion? If someone could send the secret key securely, then in theory he or she would not need a cryptosystem in the first place—the secure channel could be simply used to send the message. Often, trusted couriers and digital certificates are used as a solution to this problem. Another method for communicating symmetric keys (as well as messages) is the well-known RSA asymmetric public key cryptosystem, which is used in the popular security tool Pretty Good Privacy (PGP).

Another asymmetric cryptosystem is elliptic curve cryptography (ECC). This methodology, which is explained in greater detailed below, is an approach to public key/private key cryptography based on the mathematics of elliptical curves. An elliptical curve is a set of solutions (x, y) to an equation of the general form $y^2=x^3+ax+b$, which is an open curve on a graph. In contrast, a circle is a form of closed curve that graphically represents a set of solutions to an equation of the form $(y-a)^2=r^2-(x-b)^2$, where a and b are coordinates of the center of the circle and r is the radius. Elliptic curves as a mathematical phenomenon have been studied for the about 150 years, but the application of elliptic curves to cryptography was proposed circa 1985 independently by the researchers Neal Koblitz and Victor Miller.

An asymmetric cryptosystem may be generally represented as an encryption function E( ) and a decryption function D( ), such that D((E(P))=P, for any plaintext P. In a public key cryptosystem, E( ) can be easily computed from a public key (PuK), which in turn is related to and computed from a private key (PrK). The public key PuK is sometimes published so that anyone having the key can encrypt messages. If the decryption function D( ) cannot easily be computed from the public key PuK without knowledge of the private key PrK, but can be computed readily with the private key, then it follows that only the person who generated the private key PrK can decrypt the messages encrypted with the public key. This is an essential useful attribute of public key/private key cryptography. The reliability of public key/private key cryptography depends on the two keys, PuK and PrK.

Public key/private key cryptography has at least three principal applications. First is basic encryption-keeping the contents of messages secret. Second, digital signatures are implemented using public key/private key techniques. U.S. Pat. Nos. 6,851,054, 6,820,202, 6,820,199, 6,789,189 and others, the disclosures of which are incorporated by reference herein, are examples of digital signature type systems that utilize aspects of public key/private key cryptography. Third, electronic authentication systems that are not based strictly on conventional digital signature techniques may be implemented with public key/private key cryptography. Some of the foregoing incorporated and referenced patents describe certain aspects of such authentication systems.

With respect to the mathematical properties of elliptic curves, it is now known that specific operations can be geometrically defined that limit the number of points on an elliptic curve to a finite set of points defining a finite cyclic group. Such an elliptic curve group can be used in conjunction with the known Elliptic Curve Discrete Logarithm Problem (ECDLP) in an encryption scheme to create an elliptic curve cryptosystem, which is generally believed to be secure and powerful given current computing technologies.

In implementing ECC and, specifically, in generating an asymmetric public-private key pair for use in the Elliptic Curve Digital Signature Algorithm (ECDSA), an elliptic curve is defined by certain "domain" parameters, and a point is chosen along the elliptic curve that serves as a generator of a finite cyclic group, all the elements of which also lie along the elliptic curve. This generator is referred to as the "generating point" or "base point" (P). The domain parameters include: the field identification (or "Field ID") identifying the underlying finite or Galois field, traditionally represented as "$F_{2p}$" or "$F_{2m}$"; the curve comprising two coefficients "a" and "b" of the elliptic curve equation $y^2=x^3+ax+b \mod p$; a generating point $(x_p, y_p)$; and the order of the generating point "n" comprising a prime number. Optionally, the domain parameters may include other specifications, such as, for example, a bit string seed of length 160 bits—if the elliptic curve is randomly generated in accordance with governmental standards, or a cofactor. The domain parameters further may include additional specifications, such as the appropriate bit length of a key.

In certain known methodologies for ECC, after a generating point (P) specified, a first public-private key is first generated essentially by obtaining a large random number (R) from a random number generator or pseudo random number generator; and then using the random number as a "multiplier" of the generating point (i.e., P is repeatedly "added" R times) to arrive at the public key (PuK). The random number multiplier used to generate the public key is the private key (PrK) of the public-private key pair.

Those skilled in the art will appreciate that an ECC public key is an element of the finite cyclic group of the elliptic curve generated by the generating point. Furthermore, because the multiplier (PrK) used to arrive at the public key is randomly generated, the function used to first generate the public-private key pair is a nondeterministic function to the extent that the private key is unknown, i.e., not yet generated. Indeed, certain governmental standards for ECC require that the private key be generated utilizing a random number generator or pseudo random number generator. Because generation of the public-private key pair is performed using a nondeterministic function and, specifically, because the private key is generated from a random number or pseudo random number generator, at least the private key must be saved to perform later cryptographic operations with either one of the keys of the public-private key pair. (Only the private key must be saved because, if the private key is known, then the function used to generate the public key is a deterministic function of the known private key, and the public key can be generated as needed.)

As mentioned above, certain known public key/private key cryptosystems typically utilize the random number approach in key generation. However, it is believed that additional security aspects for public key/private key generation can be obtained by utilizing measures other than strictly using a random number during in the key generation algorithms. A deterministic function, as compared to a nondeterministic function, can provide security that is more than adequate for many applications, especially in an elliptic curve cryptosystem, and may provide certain benefits not available in nondeterministic key generation approaches. For example, a deterministic function may be used to assist in securely storing a private key in an electronic device, or in generating a public key/private key pair for use in an "on demand" cryptographic operation in a computer system that itself may not be capable of storing or protecting the private key from access by potential eavesdroppers. Furthermore, a deterministic function can extend the usability of a public/private key pair by making a single private key useable by multiple parties while still being able to show intent between the two parties.

In utilizing ECC—or any other cryptographic system, any cryptographic key used for encryption must be protected from compromise, especially during storage. Otherwise, the integrity of the cryptographic system is jeopardized. For example, if an insecure or network-accessible computer system and/or software is used in connection with a cryptographic operation, there is a risk that the keys stored in that computer system could be obtained and improperly utilized.

One manner of securely storing a cryptographic key comprises encrypting the cryptographic key itself within a computer system as a function of a PIN, password, or passphrase of a user who is authorized to use the cryptographic key, and then to save or store the encrypted key indefinitely within the computer system. When the key is required for a particular cryptographic operation, the user must input into the computer system the PIN, password, or passphrase, which then is used to decrypt the key, and the decrypted key then is used, in turn, to perform the cryptographic operation. Thereafter, the decrypted key is deleted in the computer system, and the encrypted key remains saved or stored within the computer system for later decryption and subsequent use, as needed.

Safeguarding cryptographic keys, especially private keys in public-private key cryptographic systems, is important if adoption and use of cryptography by the general public in electronic communications is to become prevalent. The safeguarding of cryptographic keys is especially important in connection with the conduct of electronic transactions such as, for example, financial transactions. Facilitating the adoption and use of cryptography in such electronic communications—especially adoption and use of digital signatures—also is important, as demand for greater security, reliability, and accountability in such electronic communications is believed to be increasing.

Accordingly, there is a need for improved methods for securely generating and protecting cryptographic keys, especially in asymmetric public key/private key cryptosystems. Such improved methods are believed usefully for facilitating the adoption and use of cryptography for electronic communications, secure financial transactions, and in particular, the adoption and use of digital signatures in various applications.

SUMMARY OF THE INVENTION

Briefly summarized, many aspects and features of the present invention relate to, and are described in, the context of generating and safeguarding asymmetric keys, such as public key/private keys, for use in elliptic curve cryptography (ECC), but the present invention is not thereby necessarily limited to such cryptography. Particular aspects of the invention relate to safeguarding private keys, thereby facilitating adoption and use of cryptography in electronic communications and, in particular, adoption and use of digital signatures.

More particularly described, certain aspects of the invention(s) relate to methods for generating a cryptographic key utilizing a deterministic function. These aspects include the steps of receiving into a computer system input data from a user (also referred to as user input data or "UID"); generating within the computer system the cryptographic key as a deterministic function of the received UID; and, following generation of the cryptographic key, clearing from the computer system the received UID so that the received UID is no longer available within the computer system for regenerating the cryptographic key within the computer system. Indeed, following clearing from the computer system of the UID, the UID must be received again within the computer system in order to regenerate the cryptographic key within the computer system using the same deterministic function that was initially utilized to generate the cryptographic key.

In one of these aspects, the cryptographic key that is generated is a private key of an asymmetric public-private key pair, and the private key is not exported from the computer system. Instead, the private key is utilized within the computer system in one or more cryptographic operations or functions. Thereafter, the private key is cleared from the computer system so that the private key is no longer available within the computer system for use in any cryptographic operations or functions.

In another one of these aspects, the cryptographic key that is generated is a public key of an asymmetric public-private key pair, and the public key is exported from the computer system for use in one or more cryptographic operations or functions. Additionally, when the public key is generated, the public key preferably is generated as a deterministic function of its corresponding private key, with the private key being generated within the computer system in accordance with the aforementioned aspect.

The present invention also includes aspects in addition to providing a cryptographic key. In one such aspect, a digital signature is provided using a cryptographic key. The digital signature is provided by receiving into a computer system input data from a user (UID); generating within the computer system a cryptographic key as a deterministic function of the UID; and generating within the computer system a digital signature as a deterministic function of using the cryptographic key. Furthermore, following generation of the cryptographic key, the UID is cleared from the computer system so that the UID is no longer available within the computer system for regenerating the cryptographic key within the computer system. The cryptographic key also is cleared from the computer system following generation of the digital signature so that the cryptographic key is no longer available within the computer system for generating a digital signature within the computer system.

With respect to this aspect of the present invention, the cryptographic key utilized to generate the digital signature preferably is not exported from the computer system. The cryptographic key also preferably comprises a private key of a public-private key pair, and the digital signature preferably is generated utilizing an elliptical curve digital signature algorithm.

In another aspect of the present invention, the function utilized to generate the digital signature is a further function of whether a digital signature has yet been generated using the cryptographic key following receipt of the UID. This preferably includes maintaining an indicator to indicate whether a digital signature has yet been generated using the cryptographic key following last receipt of the UID. In this case, the function utilized to generate the digital signature is a function of the indicator as well as the cryptographic key. It will be understood, however, that the indication of use need not be included in the generation of the digital signature, in such embodiment of the invention.

In all of these aspects of the present invention, if the cryptographic key generated is not exported, then the cryptographic key preferably is cleared from the computer system. Not saving or storing the cryptographic key in any form—whether encrypted or otherwise—is believed to be a superior defense against compromise of the cryptographic key. In other words, "if you don't have it, you cannot lose it."

The clearing of the cryptographic key from the computer system may be performed immediately upon its use in a cryptographic operation or function, in which case the cryptographic key is only temporarily stored within the computer system (e.g., cached), and it is extremely transient in nature. Alternatively, the cryptographic key may be temporarily stored within the computer system for a short, predetermined period of time, whereby the cryptographic key can be reused in another cryptographic operation or function during this predetermined period of time, as needed. In either scenario, the cryptographic key still is cleared from the computer system within a short, predetermined period of time of being generated within the computer system. Furthermore, because the cryptographic key is not saved or stored—either in encrypted form or otherwise—within the computer system for more than this short, predetermined period of time, the cryptographic key is considered to be an "ephemeral" cryptographic key.

It would be understood that the cryptographic key is "ephemeral" in the sense that it disappears or is removed and thus no longer immediately available for use or subject to compromise. In accordance with an aspect of the invention, there is provided a method for re-creating a key at any time, given the same passphrase and function. Accordingly, such a re-creatable key may be considered long-lived in the one sense, but ephemeral (having a limited lifetime) in a more immediate sense.

As examples of this, the cryptographic key may be cleared from the computer system within a single day, a single hour, a single minute, and in some cases, within a single second of being generated. Moreover, the predetermined period of time may be a predetermined fixed amount of time, such as five minutes following generation of the cryptographic key.

Alternatively, or in addition thereto, the period of time may be defined by a beginning and ending event. The beginning event may be, for example, the generation of the cryptographic key. The ending event may be the generation of a predetermined number of digital signatures using the cryptographic key. The ending event further may be the change in the identification of a program requesting the generation of a digital signature, or the change or termination of a communications session of the computer system. For example, leaving a first Internet domain for another Internet domain may terminate a communications session of the web browser with the first domain, thereby causing a generated cryptographic key to be cleared from the computer system of the web browser. The communications session similarly may timeout, thereby causing a generated cryptographic key to be cleared from the computer system of the web browser.

Also in all of these aspects of the present invention, the clearing of the UID may be performed immediately upon the generation of the cryptographic key, in which case the UID is only temporarily stored within the computer system (e.g., cached), and it is extremely transient in nature. Alternatively, the UID may be temporarily stored within the computer system for a short, predetermined period of time, whereby the cryptographic key can be regenerated using the stored UID during this predetermined period of time, as needed. Much like the step of clearing the generated cryptographic key, the predetermined period of time after which the UID may be cleared may be a predetermined fixed amount of time. Alternatively, or in addition thereto, the period of time also may be defined by a beginning and ending event.

The methods and processes of the aforementioned aspects and features of the present invention each may be performed, for example, in a desktop computer; laptop computer; personal digital assistant (PDA); or telephonic device.

In yet another aspect of the present invention, communication using a digital signature is facilitated by communicating software to a first party; receiving from the first party a cryptographic key generated using the software; and recording in a database the cryptographic key in association with information pertaining to the software that was used to generate the cryptographic key. The recording is done by a second party different from the first party.

Preferably, the software generates both a public key and a private key of an asymmetric public-private key pair. In this aspect, the key pair is generated in accordance with the present invention, preferably by: receiving input data from a user (UID); generating the private key as a deterministic function of the UID; clearing the UID from the computer system; generating the public key as a deterministic function of the private key; clearing the private key from the computer system; and exporting the public key.

The information recorded in the database pertaining to the software may regard, for example: the version of the software; the author, copyright holder, or owner of the software; information about the deterministic function used in the software to generate the public key and/or the private key based on input data from a user (UID); information about when the UID is cleared and how it is cleared; information about when the private key is cleared and how it is cleared; and the algorithm utilized for generating digital signatures as a function of the private key, including any parameters of the algorithm required to verify digital signatures.

The software also preferably generates a digital signature in accordance with the present invention by receiving, again, the UID and regenerating the private key. Following generation of a digital signature, the private key and UID again are cleared. In this regard, the software also preferably includes computer-executable instructions for receiving an electronic message, wherein the digital signature is generated for the received electronic message using the function of the private key. The software also may include computer-executable instructions for repeatedly generating a digital signature using the regenerated first key for a predetermined period of time. The software preferably utilizes elliptical curve cryptography in generating digital signatures.

The software also may include computer-executable instructions for maintaining an indicator of whether a digital signature has been generated using the private key following last receipt of the UID, and the function of generating the digital signature may be a further function of the indicator, i.e., the indicator may be a further argument of the function.

The software may be communicated to the first party over the Internet, such as being downloaded from a website. The software also may include additional computer-executable instructions for exporting information identifying the software itself to the second party. The identifying information may include: a hash value; and the identifying information may be digitally signed using the software. The identifying information may be exported with the second key for communication thereof to the second party. In this case, the information recorded in the database by the second party preferably pertains to the software that is identified to the second party by the identifying information.

The software itself may be executed, for example, in a desktop computer; laptop computer; personal digital assistant (PDA); or telephonic device.

In addition to the aforementioned aspects and features of the present invention, it should be noted that the present invention further includes the various possible combinations of such aspects and features. Examples of such combinations are illustrated in the detailed description set forth below.

More specifically, the present invention generally relates to an Elliptic Curve Cryptosystem and, more particular, to a method of providing an ephemeral cryptographic key based on user input data. The comments above as to the nature of an "ephemeral" key are applicable here as well. In one embodiment, the method includes the steps of (a) receiving into a computer system input data from a user, (b) generating within the computer system a cryptographic key as a deterministic function of said received data of step (a), (c) following said step (b) of generating the cryptographic key, clearing from the computer system said received data of said step (a) so that said received data is no longer available for generating the cryptographic key, and (d) clearing from the computer system said generated cryptographic key upon expiration of a predetermined period of time. In one embodiment, the method further comprises a computer system. In another embodiment, the method further comprises a computer-readable medium having computer-executable instructions for performing the method. Neither said received data of step (a) nor said generated cryptographic key of step (b) is exported from the computer system.

In a first embodiment, following said step (c) of clearing said received data from the computer system, the input data received from the user in step (a) must be received again within the computer system in order to regenerate the cryptographic key within the computer system using the deterministic function of said step (b). In a second embodiment, said step (d) of clearing from the computer system said generated cryptographic key comprises overwriting said generated cryptographic key in a computer-readable medium of the computer system. In a third embodiment, said step (c) of clearing from the computer system said received data occurs upon performance of said step (b) of generating the cryptographic key. In a fourth embodiment, said step (c) of clearing from the computer system said received data occurs immediately upon performance of said step (b) of generating the cryptographic key. In a fifth embodiment, said step (c) of clearing from the computer system said received data comprises overwriting said received data in a computer-readable medium of the computer system.

The said generated cryptographic key of said step (b) comprises a private key of a public-private key pair. In one embodiment, the deterministic function of said step (b) outputs a large integer value. In another embodiment, the deterministic function of said step (b) comprises hashing said received data.

The input data from the user represents one of a passphrase, a password, a PIN and a biometric. In one embodiment, the biometric comprises at least one of facial characteristics, hand geometry, a fingerprint, a thumbprint, ocular characteristics of the retina, ocular characteristics are characteristics of the iris, a vascular pattern, a DNA pattern, a vocal behavior, signature dynamics, and keystroke dynamics.

In another aspect, the present invention relates to a method of providing a cryptographic key. In one embodiment, the method includes the steps of (A) receiving into a computer system input data from a user, (B) generating within the computer system a cryptographic key as a deterministic function on said received data of said step (A), (C) following said step (B) of generating the cryptographic key, clearing from the computer system said received data of said step (A) so that said received data is no longer available for generating the cryptographic key, and (D) exporting said generated cryptographic key from the computer system. In one embodiment, the method further comprises a computer system. In another embodiment, the method further comprises a computer-readable medium having computer-executable instructions for performing the method.

In one embodiment, the said received data of said step (A) is not exported from the computer system. In another embodiment, said generated cryptographic key comprises a public key of an asymmetric public-private key pair.

Said step (C) of clearing said received data is performed, in one embodiment, prior to, and in another embodiment, after performing said step (D) of exporting said generated cryptographic key. In one embodiment, the said step (C) of clearing from the computer system said received data occurs upon performance of said step (B) of generating the cryptographic key. In another embodiment, the said step (C) of clearing from the computer system said received data occurs immediately upon performance of said step (B) of generating the cryptographic key. In yet another embodiment, following said step (C) of clearing said received data from the computer system, the input data received from the user in said step (A) must be received again within the computer system in order to regenerate the cryptographic key within the computer system using the deterministic function of said step (B).

BRIEF DESCRIPTION OF THE DRAWINGS

One or more embodiments of the present invention will now be described in detail with reference to the accompanying drawings, wherein.

DETAILED DESCRIPTION

Figure 1:
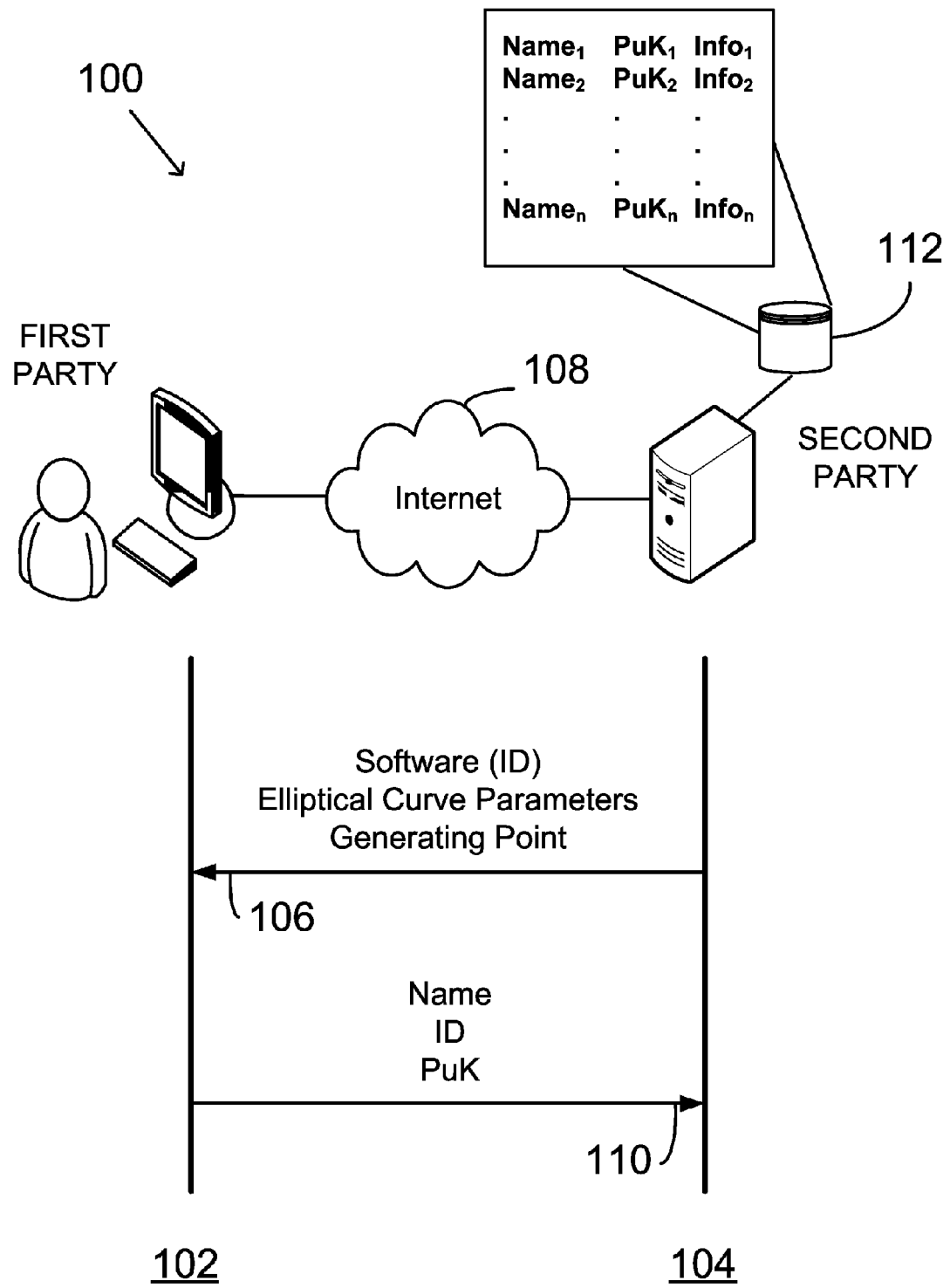
FIG. 1 illustrates a system 100 including generating, communicating, and recording a public key for facilitating communication using a digital signature in accordance with the present invention.

As a preliminary matter, it will readily be understood by one of ordinary skill in the relevant art that the present invention is susceptible of broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent a clear indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which a person skilled in the art would understand such term to mean based on the contextual use of such term herein. To the extent that the meaning of a term used herein—as understood by the person skilled in the art based on the contextual use of such term—differs in any way from any particular dictionary definition of such term, it is intended that the meaning of the term as understood by a person skilled in the art should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

Additionally, when used herein to join a list of items, "or" generally denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" generally denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to the drawings, in which like numerals indicate like elements or steps throughout the several drawing figures, FIG. 1 illustrates a system 100 in which a public key of a first party is generated and registered with a second party using public key generation methods of the present invention. It is in the context of such an exemplary system that aspects of the present invention are useful, as well as in other systems that utilize public key/private key cryptosystems. As described in greater detail elsewhere herein, various aspects of the present invention are described with regard to providing a cryptographic key—including private and public keys of an asymmetric public-private key pair—and providing a digital signature. Further, aspects of the present invention include generation and use of a public key and digital signature in communication between different parties.

Specifically, a first party 102 obtains software from a second party 104. The software may be communicated 106 from the second party 104 via the Internet 108 as shown in FIG. 1. The software preferably includes the ability to generate public and private keys of a public-private key pair in accordance with the present invention, and includes the ability to generate digital signatures using the private key of the key pair. The algorithm utilized to generate the digital signatures preferably is the ECDSA. Furthermore, and in accordance with aspects of the invention as will be described in greater detail below, certain elliptic curve parameters and generating point are communicated between the parties and, preferably, are included in the software that is communicated to the first party.

Identifying information (also referred to as "ID") also preferably is included with the software, whereby a communication back over the Internet including the identifying information will enable the second party 104 to identify the particular software. The identifying information may include a hash value, and the identifying information may be digitally signed, to provide some measure of insurance to the second party regarding the true identity of the software.

Upon receipt of the software, the first party 102 installs and runs the software. In FIG. 1, the software is installed and executed within a desktop computer of the first party; however, any suitable computer system may be utilized by the first party such as, for example, a personal digital assistant (PDA), laptop computer, or telephonic device like a smart phone.

Preferably during an initialization period, the first party 102 generates a public key in accordance with method 400 of FIG. 4, as will be described later. The first party 102 then communicates 110 the public key back to the second party 104 together with the software ID and a name of the first party 102. Upon receipt of the communication back from the first party, the second party 104 preferably records in a database 112 a record associating the name and public key received together with information about the software that was communicated by the second party to the first party and used to generate the public key. This information pertaining to the software is known to the second party upon the receipt of the ID, which identifies the software to the second party. Furthermore, the name of the first party 102 identifies the first party 102 in the database 112 and may comprise, for example, an alias or an email address.

This information that is recorded in the database 112 in association with the generated public key preferably pertains to the software utilized to generate the public key, and may include, for example: information about the deterministic function used in the software to generate the private key based on the UID; information about the deterministic function used in the software to generate the public key based on the UID; information about when the UID is cleared and how it is cleared; information about when the private key is cleared and how it is cleared; information about if and when the public key is cleared and how it is cleared; and an identification of the algorithm utilized for generating digital signatures as a function of the private key, including any parameters of the algorithm that may be required to verify the digital signature. Preferably, this registration process is performed by the second party 104 numerous times with other parties, whereby the database 112 contains a plurality "n" of such records.

Following the registration process, the first party 102 may communicate with any third party reliably and securely provided that the third party trusts the second party 904 and the information recorded in the database 112 by the second party 104. Thus, for example, in FIG. 2 a system 200 is illustrated for facilitating communication between the first party 102 and a third party 202 using a digital signature in accordance with the present invention. In system 200, the first party 102 communicates 204 to the third party 202 a name, message, and digital signature for the message. The digital signature is generated in accordance with the present invention such as by using, for example, method 1000 of FIG. 10, as described below. Upon receipt of the communication from the first party 102, the third party 202 communicates 206 with the second party 104 the name received by the third party 202 from the first party 102. Upon receipt of the name, the second party 104 retrieves from the database 112 the public key and information that has been associated with the name in the database 112 during the registration process of FIG. 1. The second party 104 then communicates 208 the public key and information retrieved from the database 112 to the third party 202. The communications in process 200 may be, for example, over the Internet 108, as shown in FIG. 2.

Upon receipt of the public key and information, the third party 202 may verify the digital signature received from the first party 102. The third party 202 further may evaluate the information associated with the public key in the database in gauging the risk that either the private key utilized to generate the digital signature was compromised and that the message was not, in fact, sent from the first party 102, or that the message was altered while in transit from the first party 102 to the third party 202. Indeed, a risk level can be assigned and taken under consideration in making a business judgment as whether—and what—action to take, if any, in response by the third party 202 to receipt of the message from the first party 102. Moreover, it will be appreciated that, similar to the third party 202, the second party 102 likewise may access the database 112 for evaluating risk of fraud upon receipt itself of a message and digital signature from the first party 102.

Figure 2:
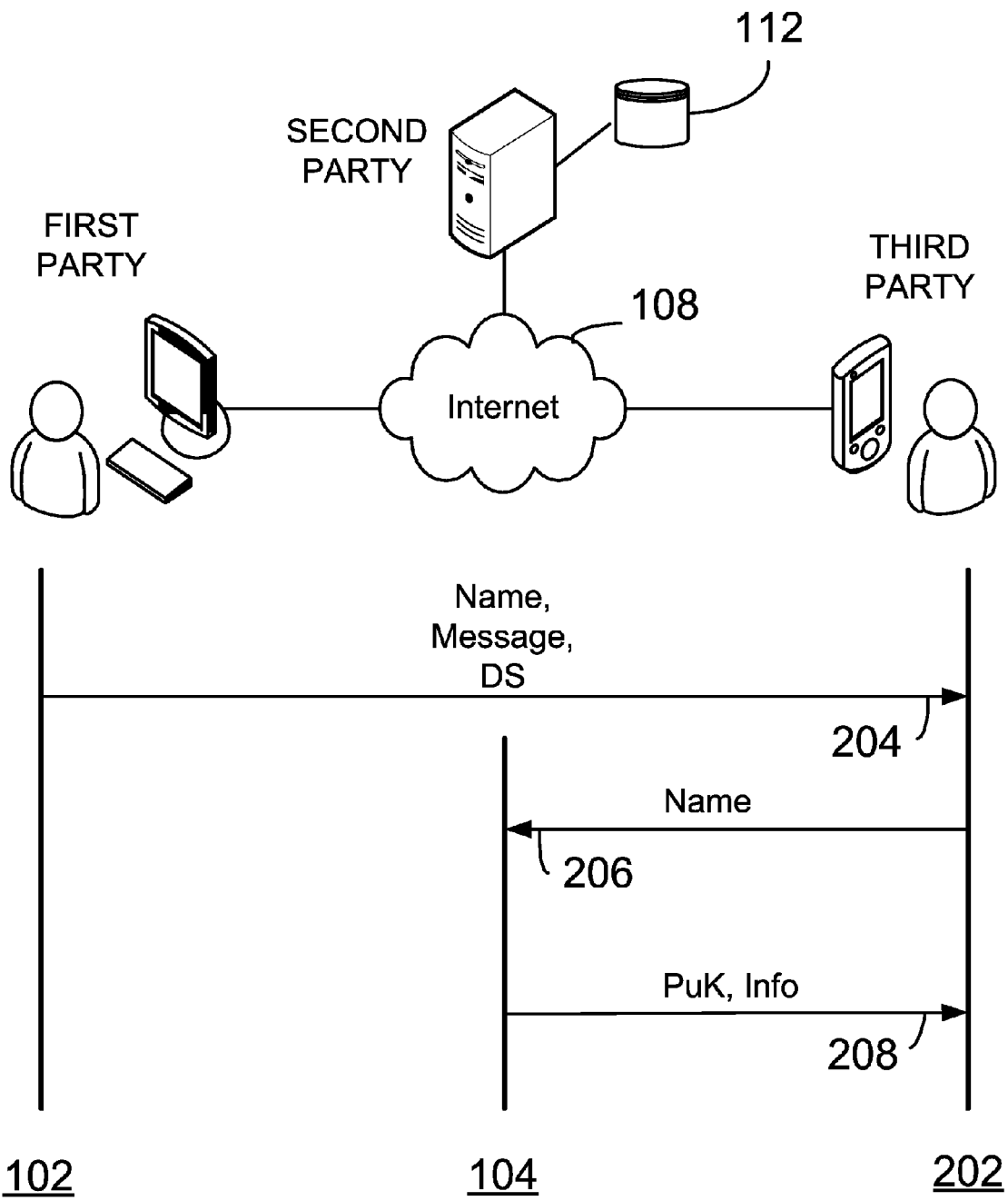
FIG. 2 illustrates a system 200 for facilitating communications using a digital signature in accordance with the present invention.

In FIG. 2, access to the database 112 by the third party 202 may be provided by the second party 104 free of charge or by subscription. Similarly, in FIG. 1, registration with the second party 104 by the first party 102 may be free or by subscription to services of the second party 104.

Mathematical Aspects of Elliptic Curves in ECC

Prior to a discussion the specific methods of the present invention, an explanation of aspects of elliptic curve mathematics will be provided, so as to provide a framework for understanding certain aspects of the present invention. As mentioned in the background section, the field of elliptic curve cryptography is based on the mathematics relating to the geometric form of an elliptic curve. The mathematics and the form itself may be foreign to the casual observer, although well understood by mathematicians as well as cryptographers.

For the purposes of this discussion we will use a circle as a simplified replacement for an elliptic curve. This substitution is possible because of the nature of the invention and the fact that this discussion does not attempt to explain in detail the field of elliptic curve mathematics or cryptography. The discussion is presented in order to understand the nature of the invention only. The discussion will draw parallels to the elliptic curve mathematics and concepts but explain them in terms of a circle.

Figure 5:
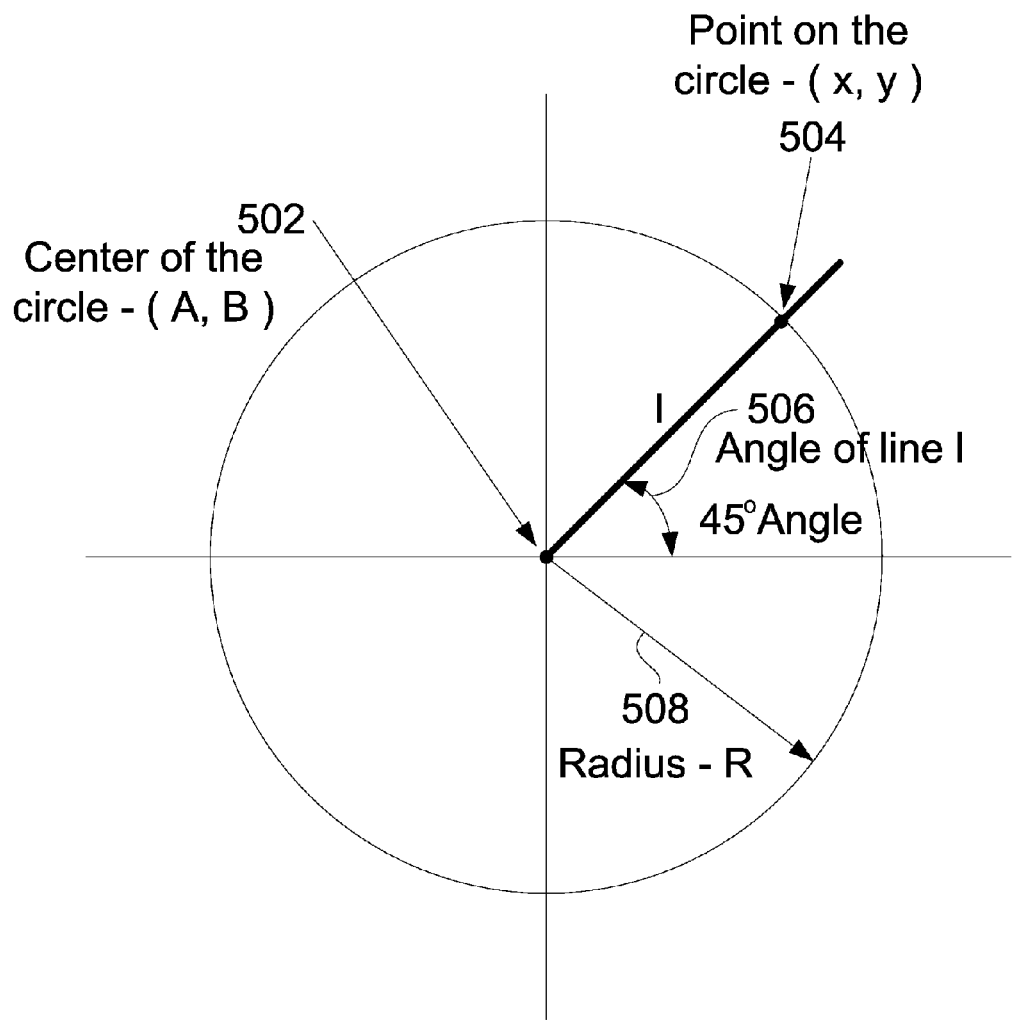
FIG. 5 illustrates a public key and a private key is generated using a circle.

A first point is to understand that an elliptic curve is simply a geometric shape, not unlike that of a circle (which is a closed shape) or an ellipse (which is also a closed shape), except that an elliptic curve is more of an open shape like a parabola. Many geometric shapes such as circles, ellipses, parabolas, and elliptical curves are definable by an equation that serves to describe the points (i.e. locations in space) that make up the geometry (shape) of the curve. A circle can be described in this same manner. FIG. 5 illustrates mathematical aspects of an exemplary geometric shape (a circle in this case), which for purposes of this simplified explanation bears certain mathematical similarities to elliptical curves.

Figure 3:
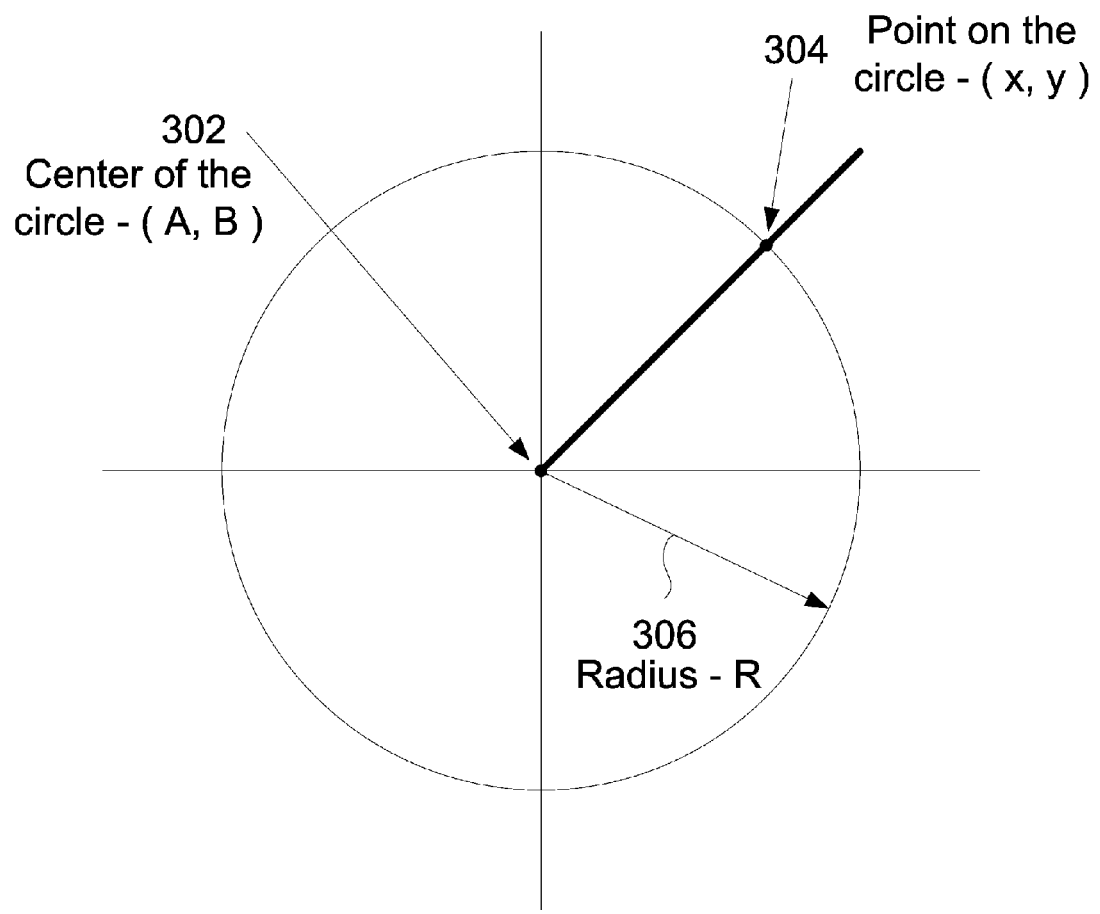
FIG. 3 illustrates a circle with its center at (A, B) and radius R.

For a circle such as is shown in FIG. 3, the equation is:

$$(x-A)^2+(y-B)^2=R^2$$

Where:

x and y is the Cartesian coordinate (x, y) of a point on the circle 304;

A and B (A, B) define the Cartesian coordinate of the center of the circle 302, A is used to represent the X axis term B represents the Y axis term; and R is the radius of the circle 306.

In order to describe the true geometric shape, other information is needed to define or differentiate the geometric shape from any other geometric shape of the same type.

Figure 4:
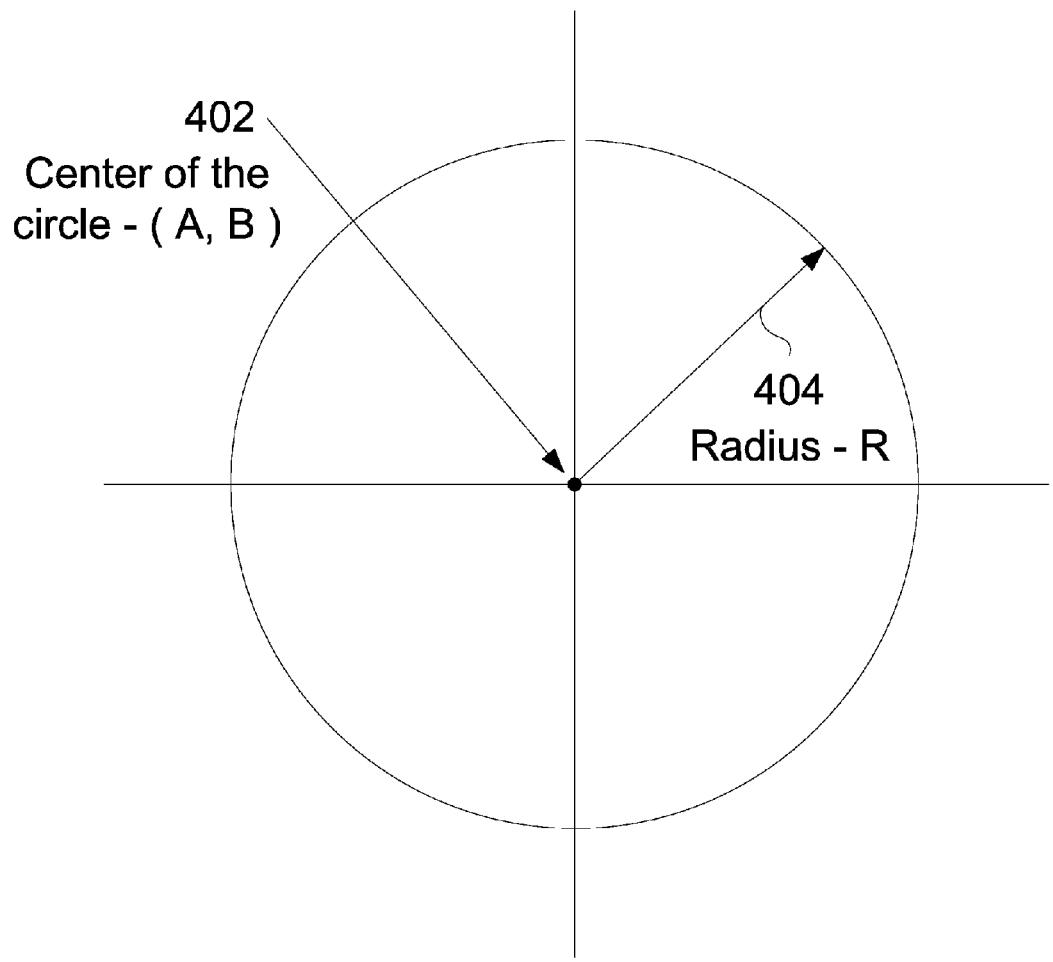
FIG. 4 shows the information needed to define a circle: center and radius.

As shown in FIG. 4, for a circle the information needed to define a specific circle is:

A coordinate in Cartesian space that serves as the center of the circle (A, B) 402; and A radius that defines the boundary of the circle R 404.

With these two pieces of information, we can uniquely describe a specific circle and calculate all of the points—i.e. (x, y) coordinates—that make up the circle.

The foregoing information of a center coordinate and radius serves to define the 'Domain' of the circle, the make-up of the circle. With respect to elliptic curves, the terms 'Elliptic Curve Domain Parameters' are often used to represent the information that defines a specific elliptic curve. Elliptic curve domain parameters serve the same purpose as the A, B and R terms in the above definition of the circle. The 'Elliptic Curve Domain Parameters' while containing different values and having different meanings than those for the circle serve the same purpose, i.e. to uniquely define a particular geometric shape. In the discussion of the circle the 'Circle Domain Parameters' are A, B and R.

Public and Private Keys in ECC

The general conceptual nature of the public key and private key in the field of elliptic curve cryptography is the same as for other forms of asymmetric cryptography. Given one value that can be kept a secret (the private key), the second value that is derived from the first can be made public (public key). The reason that the second value (the public key) can be made public is that the cost to work backwards from the public key to the private key is computationally prohibitive. The other point that is worth noting is that even though the values are both referred to as "keys" does not mean that they are equivalent in use or that the values they represent are the same.

Refer again to the circle metaphor of FIG. 3 in connection with the following description of public/private key pairs in connection with elliptical curve cryptography. It will be recalled that the domain parameters of a circle allow a way to describe all the possible points on a circle. In order to derive public/private key pairs for use in a cryptography operation, we need to determine a set of values that are related to each other but are distinguishable from other pairs of values.

With respect to the circle metaphor, if you draw a straight line originating at the center of a circle and extend it to cross the circle, you have the two related points of information that we were looking for. These would be the (x, y) coordinate that falls on the definition of the circle and the related angle that represents the line that extends from the center of the circle to the actual coordinate on the circle itself. This is specifically illustrated in FIG. 5.

In a circle metaphor, these two pieces of information (a point on a circle 504, angle of the radius 506) can be utilized as a public/private key pair. The angle 506 may be utilized as a private key, while the (X, Y) point 504 may be utilized as the public key. If the radius R 508 is known, the value of the center of the circle (A, B) 502 (which may be considered the data values encrypted) cannot be determined from merely knowing the point (X, Y)—the angle (e.g. 45°) 506 must also be known in order to uniquely define a single point (A, B). Although this example using a circle as conceptually equivalent to an elliptic curve is contrived and computationally simple to break, it should now be understood that public key and private key for use in a cryptographic operation may be derived from a similar operation by using the mathematics of an elliptic curve, much in the same fashion as herein described in connection with the mathematics of a circle.

Key Generation in ECC

Many cryptography schemes, including conventional ECC, depend on properties of randomness for the actual generation of key pairs. In the circle metaphor we need to determine an angle that serves as the private key for a key pair and allow us to determine the matching (X, Y) coordinate that will serve as the related public key. The traditional method of generating a private key would be to use a random number in the generation of the angle. For example, we could generate a random number that is greater than −1 and less than 360 and this could serve as our 'private key' or 'angle'. With this angle we can mathematically determine the corresponding (X, Y) coordinate on the circle that is denoted by the angle. A side effect of using a random number for the generation of the angle is that you must store the angle once it is generated. The reason that the generated angle must be stored is that since it was generated through at Random (using a random number) it would be difficult (next to impossible) to regenerate the same Angle predictably.

At this point we have enough metaphorical information to begin to specifically address the nature of the 'passphrase' invention. The basis of these aspects of the invention is that we are replacing the random number used in key generation with a calculation that can be repeated given the same input. This repeatable calculation is called a 'deterministic function' A deterministic function is a calculation that, given a specific input, will always produce the same output. For example, 2 times X or (2*X) is a deterministic function. If you replace the 'X' term with the same number (e.g. 3) you will get a result that can be repeated every time you replace the 'X' term with that same number. Thus, the mathematical operation of (2*3) always produces 6, no matter how many times the computation is repeated—the answer will always be 6 when the 'X' term is replaced with 3.

In the "passphrase" aspects of the invention, the private key in a private/public key pair is generated through a deterministic function instead of the more traditional method of generating the private key through a random function. The passphrase could be a word a sentence or any string of characters that are memorable to the user. This passphrase serves as the input to a deterministic function that provides as output a value that is suitable for use as the private key. A simple example of a possible implementation of this concept is below (the algorithm and function are illustrative only).

In accordance with aspects of the invention, we first define a set of acceptable characters that can be used to form a passphrase. For our example we will use the common characters: alphabetic/numeric and punctuation. For each allowable character we assign a numeric value that will represent the character in our calculation. This provides a table such as shown in the following example:

TABLE 1

| Character | Value |
|---|---|
| ! | 33 |
| " | 34 |
| # | 35 |
| $ | 36 |
| % | 37 |
| & | 38 |
| ' | 39 |
| ( | 40 |
| ) | 41 |
| * | 42 |
| + | 43 |
| , | 44 |
| - | 45 |
| . | 46 |
| / | 47 |
| 0 | 48 |
| 1 | 49 |
| 2 | 50 |
| 3 | 51 |
| 4 | 52 |
| 5 | 53 |
| 6 | 54 |
| 7 | 55 |
| 8 | 56 |
| 9 | 57 |
| : | 58 |
| ; | 59 |
| < | 60 |
| = | 61 |
| > | 62 |
| ? | 63 |
| @ | 64 |
| A | 65 |

TABLE 1-continued

| Character | Value |
|---|---|
| B | 66 |
| C | 67 |
| D | 68 |
| E | 69 |
| F | 70 |
| G | 71 |
| H | 72 |
| I | 73 |
| J | 74 |
| K | 75 |
| L | 76 |
| M | 77 |
| N | 78 |
| O | 79 |
| P | 80 |
| Q | 81 |
| R | 82 |
| S | 83 |
| T | 84 |
| U | 85 |
| V | 86 |
| W | 87 |
| X | 88 |
| Y | 89 |
| Z | 90 |
| [ | 91 |
| \ | 92 |
| ] | 93 |
| ac;0 acx;[<x]s;5;%ffamily.Ax | 94 |
| _ | 95 |
| ` | 96 |
| a | 97 |
| b | 98 |
| c | 99 |
| d | 100 |
| e | 101 |
| f | 102 |
| g | 103 |
| h | 104 |
| i | 105 |
| j | 106 |
| k | 107 |
| l | 108 |
| m | 109 |
| n | 110 |
| o | 111 |
| p | 112 |
| q | 113 |
| r | 114 |
| s | 115 |
| t | 116 |
| u | 117 |
| v | 118 |
| w | 119 |
| x | 120 |
| y | 121 |
| z | 122 |
| { | 123 |
| | | 124 |
| } | 125 |
| ~ | 126 |

Next, a deterministic function is defined that will turn a word, sentence, or any string of character into a value suitable as a replacement for the random angle value. One example of a deterministic function is to cumulate the numerical values of the characters of an input string (e.g. the word "Pass-Word"), divide by a predetermined number (e.g. 360), and use the remainder of the division operation as an angle value. Such an exemplary deterministic function would be expressed as follows in conceptual terms:

(1). Start with a value of zero in the 'Passphrase Work Value' which is a cumulation data variable.

(2). For every character in the input string (e.g. "PassWord"), look up the value corresponding to that character and add it to the value in the data variable 'Passphrase Work Value'.

(3). When all of the input characters of the string are exhausted, divide the cumulative value in 'Passphrase Work Value' by 360, and assign the remainder of this division (Modulo 360) to 'Passphrase Angle'.

(4). The value or number of the variable 'Passphrase Angle' is then utilized as a private key.

Assume that the input or passphrase is the string "PassWord" without the quotes. If we start with zero (0) in the 'Passphrase Work Value' and take the first character ("P") of the string and look it up in the above table we find the value 80. Add this value to the 'Passphrase Work Value' giving the value 80 for 'Passphrase Work Value' Move to the next character ("a") in the string and perform the same lookup as before, which yields the value 65. Add the value 65 to the 'Passphrase Work Value', which cumulates to 145. Continue this process until there are no more characters in the input string. In this example, the cumulated values of the passphrase "PassWord" would yield the following computation:

TABLE 2

| P | a | s | s | W | o | r | d | Passphrase Work Value |
|---|---|---|---|---|---|---|---|---|
| 80 | | | | | | | | 80 |
| | 97 | | | | | | | 177 |
| | | 115 | | | | | | 292 |
| | | | 115 | | | | | 407 |
| | | | | 87 | | | | 494 |
| | | | | | 111 | | | 605 |
| | | | | | | 114 | | 719 |
| | | | | | | | 100 | 819 |

When the input characters of the string "PassWord" are exhausted, the value of 627 remains in the variable Passphrase Work Value. Based upon the definition of our deterministic function, 819 is divided by 360:

819/360=2 (with a remainder of 99)

The remainder of this division operation is assigned to be the 'Passphrase Angle' and may be utilized as a private key in accordance with this example.

The foregoing example is provided in conjunction with a mathematical shape of a circle. Those skilled in the art will understand and appreciate that the same general principles may be employed in connection with the mathematics of an elliptical curve, so as to define an angle that can uniquely define a point along an elliptical curve (as opposed to a circle), and that this point may be utilized as the public key for private key/public key cryptographic operations in accordance with aspects of the invention.

Specific Methods for Providing Cryptographic Key

Figure 6:
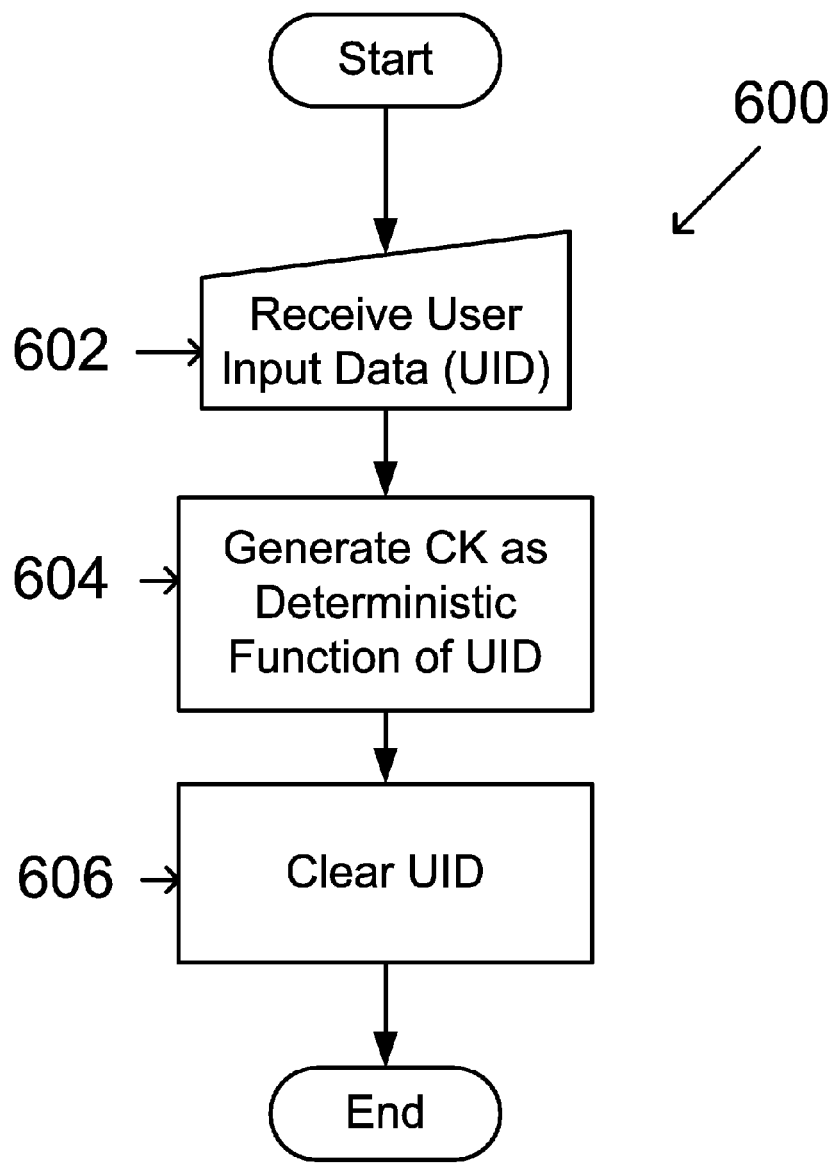
FIG. 6 illustrates a method 600 for providing a cryptographic key in accordance with the present invention.

Turning now to FIG. 6, three steps of a broad method 600 are illustrated for providing a cryptographic key in accordance with aspects of the present invention. This method includes step 602 of receiving into a computer system input data from a user (also referred to as user input data or "UID"); step 604 of generating within the computer system a cryptographic key (also referred to as "CK") as a deterministic function of the received UID; and, following generation of the cryptographic key, step 606 of clearing from the computer system the received UID so that the received UID is no longer available within the computer system for regenerating the cryptographic key within the computer system.

The received UID is cleared in step 606 from the computer system so that the UID must be received again within the computer system in order to regenerate the private key within the computer system using the same deterministic function of step 604. Preferably, the cryptographic key generated in step 604 is utilized in a cryptographic operation or is exported from the computer system for use in a cryptographic operation.

The UID received in step 602 may be something that is known by the user or something that is generally unique to the user, such as a biometric, or both. If the UID is to comprise something that is known by the user, then the UID preferably comprises any one of a PIN, password, and passphrase. If the UID is to comprise something that is generally unique to the user, then the UID preferably comprises a physical or behavioral biometric. Examples of physical biometrics include: facial characteristics; hand geometry; fingerprints; thumbprints; ocular characteristics, such as of the retina or iris; vascular patterns; and DNA patterns. Examples of behavioral characteristics include: vocal behavior; signature dynamics; and keystroke dynamics.

Step 606 of clearing the received UID preferably includes overwriting the UID wherever it is stored or saved in the computer system. The overwriting preferably includes wiping or writing pseudo random bit strings to the data blocks of the computer memory in which the UID is saved or stored.

In a feature of this method 600, the clearing of the UID is performed immediately upon the generation of the cryptographic key in step 604. In this case, the UID is only temporarily stored within the computer system (e.g., cached) for a very short period, and it is extremely transient in nature. The transient nature of the UID reduces the risk that the UID may be copied or otherwise compromised by another who would then utilize the UID in regenerating the cryptographic key for use without authorization.

In an alternative feature of this method 600, the clearing of the UID is not performed immediately upon the generation of the cryptographic key in step 604 but, instead, it cleared within a short, predetermined period of time, i.e., when a short, predetermined period of time has expired. In this case, the UID is temporarily stored within the computer system for the short, predetermined period of time, whereby the cryptographic key can be regenerated using the stored UID during this short, predetermined period of time, as needed. While this does increases to some extent the risk of compromise of the UID, the temporary retention of the UID for regeneration of the cryptographic key during this short, predetermined period of time may provide an appreciable convenience to the authorized user. For example, with this feature, the authorized user can continue to regenerate and use the cryptographic key in other cryptographic operations during this short, predetermined period of time without the UID having to be received again within the computer system. The short, predetermined period of time after which the UID may be cleared may be a predetermined fixed amount of time. Alternatively, or in addition thereto, this period of time may be defined by a beginning event and ending event.

The deterministic function of step 604 of method 600 outputs a value using the UID as an argument of the function. This value represents the cryptographic key. The function is "deterministic" because each time the same UID is used as an argument of the function, the same output is received.

The computer system of method 600 may comprise, for example, any one of a desktop computer; a laptop computer; a personal digital assistant (PDA); and a telephonic device.

Figure 7:
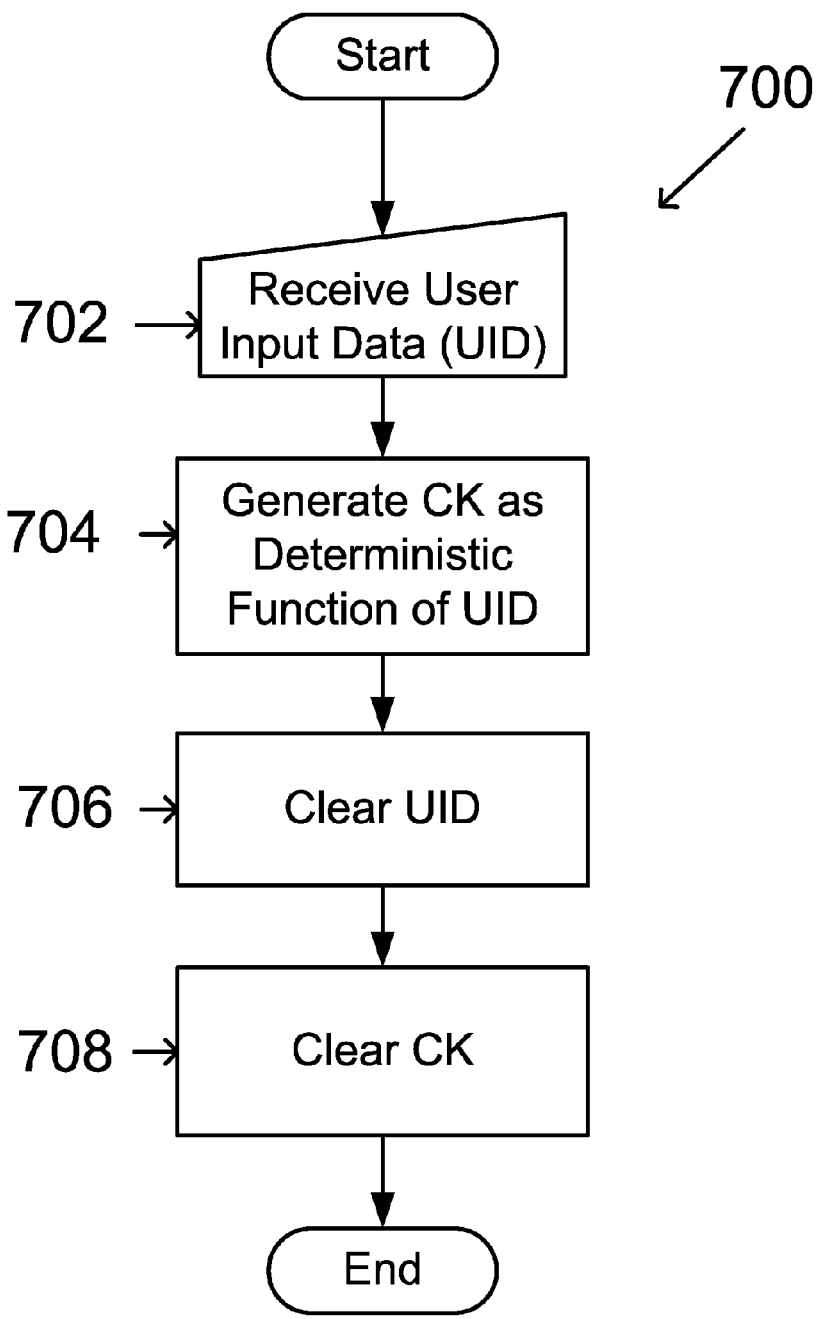
FIG. 7 illustrates a method 700 for providing a cryptographic key in accordance with the present invention.

Method 700 of FIG. 7 includes step 702, step 704, and step 706 which correspond, respectively, to step 602, step 604, and step 606 of method 600, as described above. Method 700 further includes step 708 of clearing the cryptographic key from the computer system within a short, predetermined period of time. The short, predetermined period of time preferably is defined by: a beginning event and an ending event; a fixed amount of time; or both.

For example, the clearing of the cryptographic key in step 708 may be performed immediately upon its use in a cryptographic operation, in which case the ending event is its use in the cryptographic operation and the beginning event is its generation in step 704. Moreover, in this case the cryptographic key is only temporarily stored within the computer system pending its use in the cryptographic operation (e.g., cached), and it is extremely transient in nature. The transient nature of the cryptographic key reduces the risk that the cryptographic key may be copied or otherwise compromised by another who would then utilize the cryptographic key without authorization.

Alternatively, the short, predetermined period of time may comprise a single day, a single hour, or a single second. In this case, the cryptographic key is temporarily stored within the computer system for the short, predetermined period of time, whereby the cryptographic key can be utilized in more than one cryptographic operation during this short, predetermined period of time, as needed. While this does increases to some extent the risk of compromise of the cryptographic key, the temporary retention of the cryptographic key for use in cryptographic operations during this short, predetermined period of time may provide an appreciable convenience to the authorized user.

With respect to method 700, the cryptographic key preferably is utilized within the computer system in a cryptographic function or operation following its generation in step 704 and prior to step 708 of clearing the cryptographic key from the computer system. Once cleared from the computer system, the cryptographic key is no longer available for use in a cryptographic function or operation and must be regenerated by receiving the UID again using the UID in the deterministic function of step 704. Moreover, the cryptographic key generated in step 704 preferably is not exported from the computer system.

Step 708 of clearing the cryptographic key preferably includes overwriting the cryptographic key wherever it is stored in memory of the computer system. The overwriting preferably includes wiping, or writing pseudo random bit strings to the data blocks of the computer memory in which the cryptographic key is saved or stored.

In certain preferred embodiments of method 700, the cryptographic key that is generated in step 704 preferably comprises a private key (also referred to as "PrK") of an asymmetric public-private key pair for use in ECC. In these embodiments, the output of the deterministic function in step 704 preferably is a large integer value. Furthermore, any function that can deterministically generate a suitably large number from an input value can be used as the deterministic function of step 704 to generate the private key, as a private key for use in ECC is fundamentally any suitably large number. The deterministic function itself may include such algorithms as hashing the UID; hashing multiple times the UID; and hashing multiple times the UID while folding interim hashes together. Moreover, any hashing algorithm used preferably is a strong hash function. As will be appreciated by one having ordinary skill in the art, a strong hash function is a hashing algorithm that is considered secure because it: 1) it is computationally infeasible to find a message that corresponds to a given message digest; and, 2) it is computationally infeasible to find two different messages that produce the same message digest. Using a strong hash function, any change to the UID will, with a very high probability, result in a different message digest.

When the UID comprises a PIN, password, or passphrase, the deterministic function preferably transforms the textual value of the UID into a suitably large value. When the UID is a biometric, the deterministic function preferably transforms the biometric value into a suitably large value. Values of various types of input data from a user also may be combined, such as the textual value of a PIN combined with the biometric value of a fingerprint, with the combined value comprising the argument of the deterministic function of step 704.

As will be appreciated by those skilled in the art from the foregoing, method 700 safeguards a cryptographic key by not storing or saving the cryptographic key within a computer system for any extended or indefinite period of time. Instead, the cryptographic key is ephemeral and generated from time-to-time, as needed, based on input data from a user. Because the cryptographic key is not stored or saved for an extended or indefinite period of time within the computer system, the cryptographic key is less susceptible to compromise compared to a system in which a cryptographic key is stored for an extended or indefinite period of time within the computer system. Preferably, the private key is destroyed after each use and must be regenerated again each time the cryptographic key is required for a cryptographic operation or function such as, for example, generating a public key or generating a digital signature.

Figure 8:
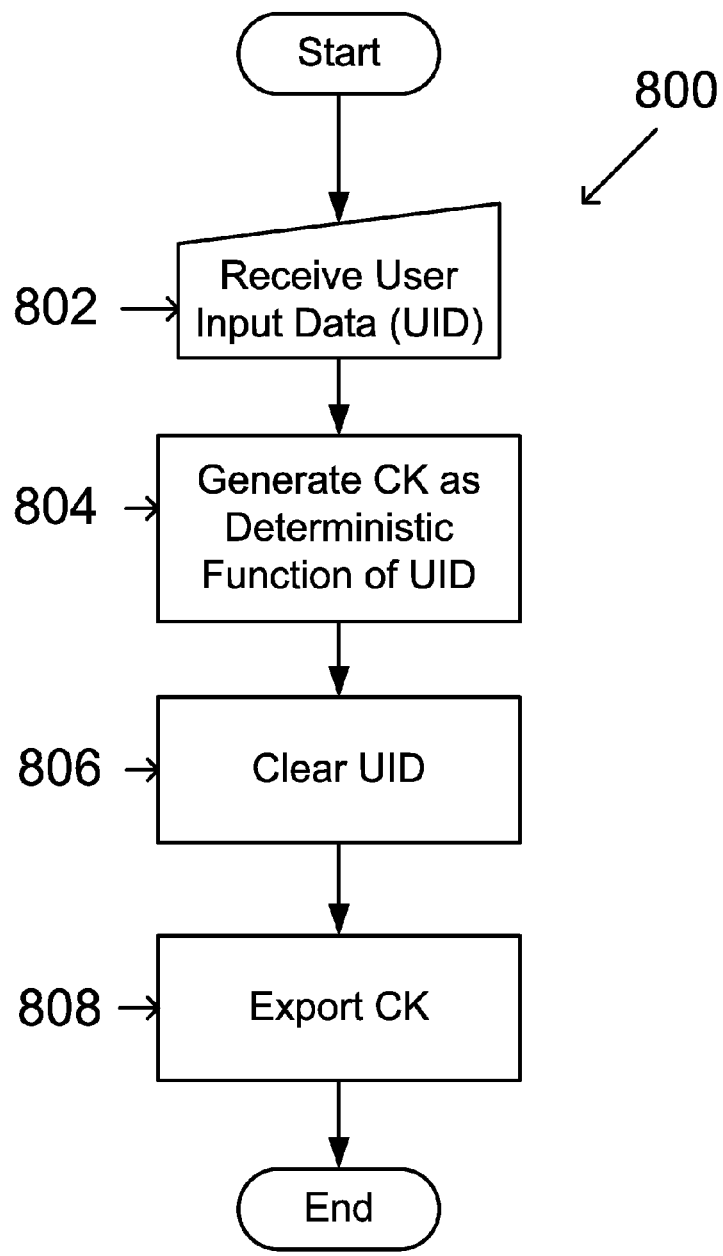
FIG. 8 illustrates a method 800 for providing a cryptographic key in accordance with the present invention.

Method 800 of FIG. 8 includes step 802, step 804, and step 806 which correspond, respectively, to step 702, step 704, and step 706 of method 700, as described above. Method 800 further includes step 808 of exporting the cryptographic key from the computer system.

In certain preferred embodiments of method 800, the cryptographic key that is generated in step 804 preferably comprises a public key (also referred to as "PuK") of an asymmetric public-private key pair for use in ECC. In these preferred embodiments, the deterministic function of step 304 subsumes the deterministic function of step 704 utilized in generating a private key of an asymmetric public-private key pair. Specifically, a private key is generated—as in step 704—as a deterministic function of the UID, and the private key then is utilized as the multiplier of the generating point to arrive at the public key. All of this is subsumed in step 804. As will be appreciated by those skilled in the art, because the private key is generated as a deterministic function of the UID, the public key also is generated as a deterministic function of the UID.

Figure 9:
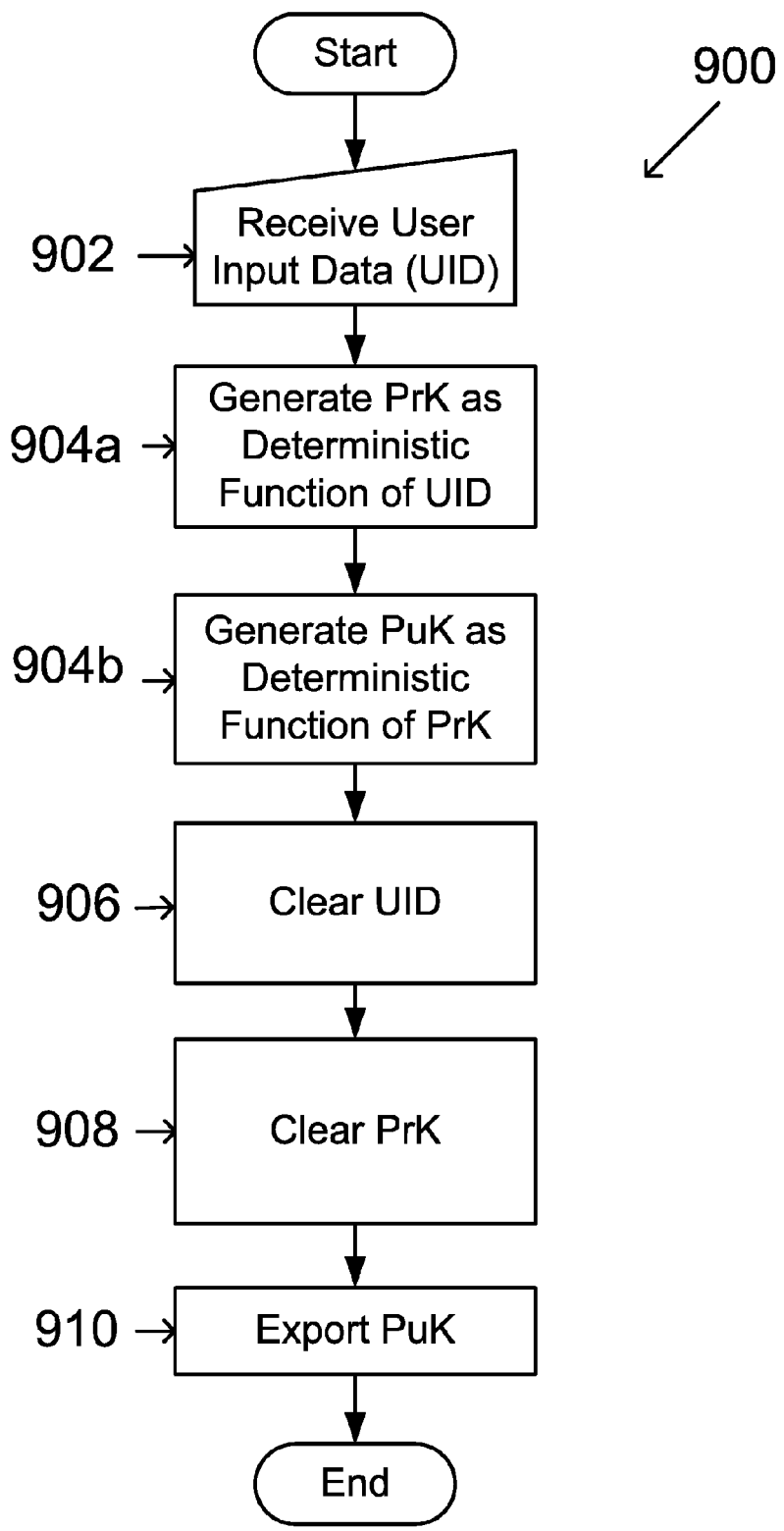
FIG. 9 illustrates a method 900 for providing an asymmetric public-private key pair in accordance with the present invention.

Method 900 includes generating two cryptographic keys—a public key and a private key of an asymmetric key pair—based on the UID received within the computer system. Furthermore, method 900 of FIG. 9 represents a combination of: method 700, in which the cryptographic key of method 700 is a private key; and method 800, in which the cryptographic key of method 800 is the corresponding public key.

In particular, method 900 includes step 902 and step 906, which correspond, respectively, to step 702 and step 706 of method 700, as described above. Method 900 further includes step 904*a*, in which a private key of a public-private key pair is generated as a deterministic function of the UID and, in fact, step 904*a* represents step 704, in which the cryptographic key of step 704 is a private key. Method 900 further includes step 904*b*, in which a public key of the public-private key pair is generated and, in fact, represents step 804, in which the cryptographic key of step 804 is a public key.

Indeed, the deterministic function utilized to generate the public key of step 904b includes, as an argument thereof, the private key, which is generated from a deterministic function of the UID; therefore, the deterministic function of step 904b is properly described as a deterministic function of the private key as well as a deterministic function of the UID. Method 900 additionally includes: step 908, which corresponds to step 708, and in which the private key is cleared from the computer system; and step 910, which corresponds to step 808, and in which the public key is exported from the computer system.

Figure 10:
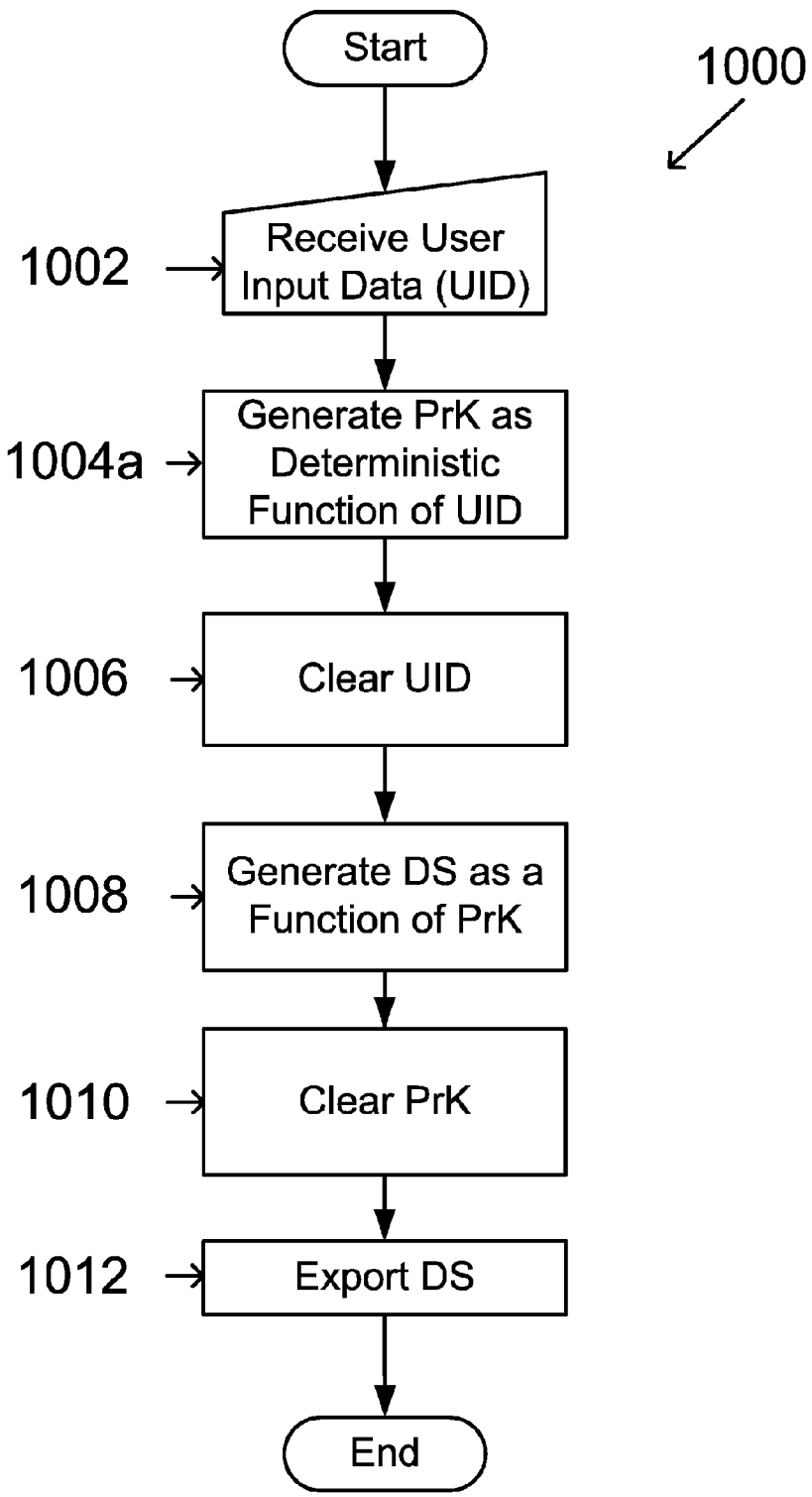
FIG. 10 illustrates a method 1000 for providing a digital signature in accordance with the present invention.
Figure 11:
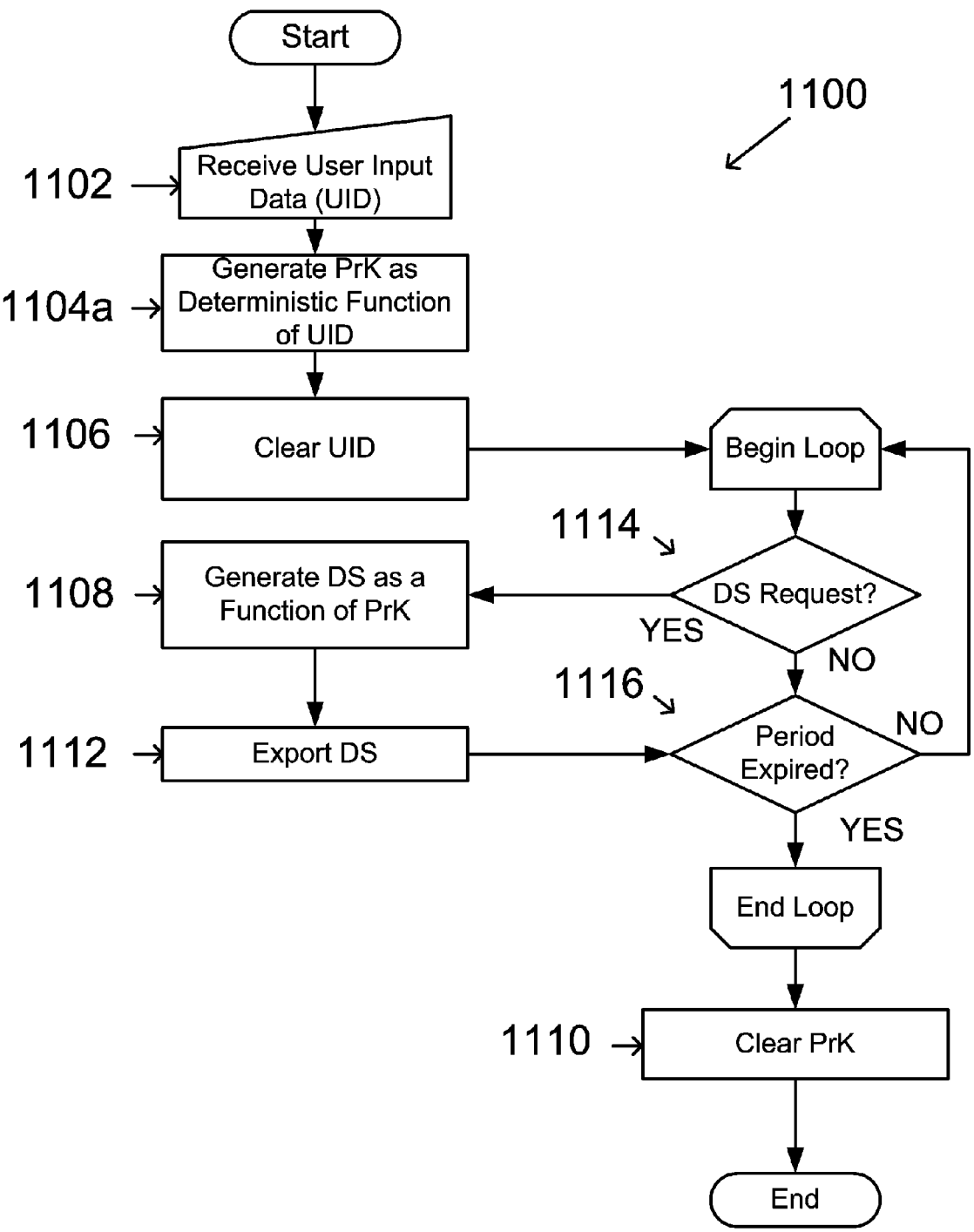
FIG. 11 illustrates a method 1100 for providing a digital signature in accordance with the present invention.

A cryptographic operation utilizing a key generated in accordance with the present invention includes the generation of a digital signature as a function of a generated private key, as shown in method 1000 of FIG. 10. In this regard, method 1000 includes step 1002, step 1004a, step 1006, and step 1010, which correspond, respectively, with step 902, step 904a, step 906, and step 908 of method 900, described above. Method 1000 further includes: step 1008, in which a digital signature is generated as a function of the generated private key of step 1004a; and step 1012, in which the digital signature preferably is exported from the computer system.

Those skilled in the art will understand that, for generation of a digital signature in accordance with certain known standard, such as ECDSA for example, a random value (nondeterministic) function is used in the digital signature generation. However, it will be appreciated that a deterministic function could be used for digital signature generation in application that do not require a random number function or other nondeterministic function.

Of course, prior to generating the digital signature, the algorithm for generating the digital signature and corresponding parameters of the cryptographic system must be known. In this regard, the method preferably further comprises, prior to generating the digital signature in step 508, receiving an identification of the appropriate algorithm to be used for generating the digital signature and the corresponding parameters to be used. In preferred embodiments, an elliptical curve digital signature algorithm (ECDSA) is utilized, and the elliptical curve parameters preferably are received prior to generating the digital signature.

Preferably, step 1010 of clearing the private key from the computer system is performed within a predetermined period of time after the generation of the private key in step 504a. This predetermined period of time may be the period in which a predetermined number of digital signatures are generated using the generated private key. Alternatively, this period of time may begin with the generating of the private key in step 504a and end with the termination of a communications session of the computer system. For example, the private key may be cleared when a web browser of the computer system ceases viewing a particular web page of an Internet domain. The communications session similarly may timeout, thereby causing the private key to be cleared from the computer system of the web browser. In another example, the generation of the digital signature may be in response to a request from a program for a digital signature. In this example, the period of time also may begin with the generating the private key and end with the request for a digital signature by a different program.

An explicit example of steps for generating more than a single digital signature during a predetermined period of time is shown by method 600 of FIG. 6. Similar to method 1000 of FIG. 10, method 1100 includes step 1102, step 1104a, step 1106, step 1108, step 1110, and step 1112 which correspond, respectively, to step 1002, step 1004a, step 1006, step 1008, step 1010, and step 1012 of method 1000, described above. Additionally, method 1100 includes step 1108 enclosed within a loop for repeated generation of a digital signature as a function of the private key when a digital signature request is made and a predetermined period of time has not expired. In this regard, a determination is made in step 1114 of whether a digital signature request has been made, and a determination is made in step 1116 of whether the predetermined period of time in which digital signatures can be generated using the private key has expired. Upon a determination in step 1116 that the predetermined period of time has expired, the private key is cleared from the computer system in step 1110. Until such time, each digital signature request that is made results in the generation in step 1108 of a digital signature and its exportation in step 1112.

Figure 12:
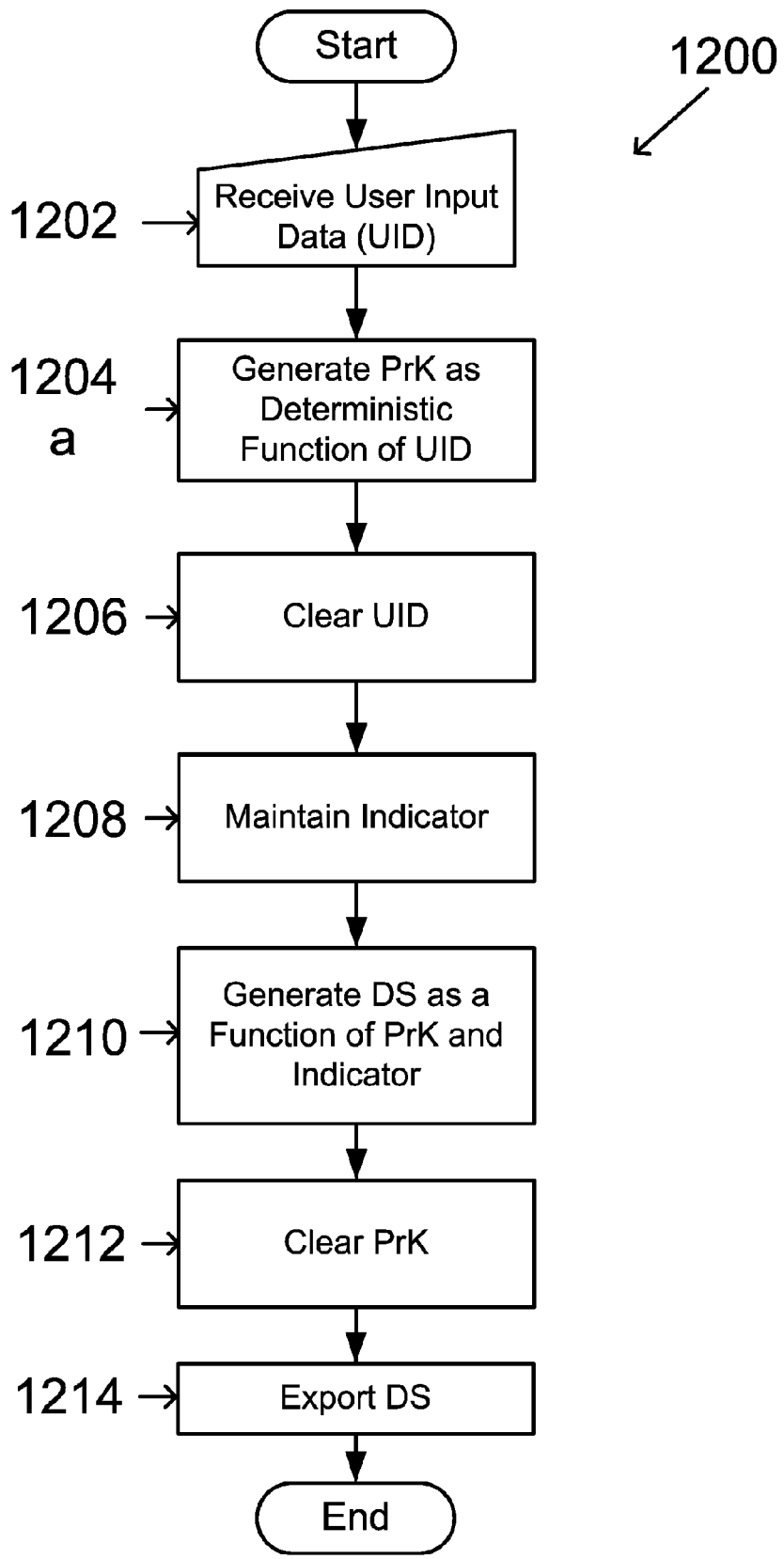
FIG. 12 illustrates a method 1200 for providing a digital signature in accordance with the present invention.

Another method in which a digital signature is generated in accordance with an aspect of the present invention is illustrated in FIG. 12. In this method, the function used to generate the digital signature is further a function of whether a digital signature has yet been generated using the generated private key following receipt of the UID. In other words, the function includes, as an argument thereof, a value that represents whether a digital signature has yet been generated. Method 1200 of FIG. 12 includes step 1202, step 1204a, step 1206, step 1212, and step 1214 which correspond, respectively, to step 1002, step 1004a, step 1006, step 1010, and step 1012 of method 1000. Method 1200 further includes step 1208, in which an indicator is maintained, and step 1210, in which a digital signature is generated as a function of the indicator as well as the private key (both are arguments of the function). The indicator preferably is maintained with values that indicate whether a digital signature has yet been generated using the private key following last receipt of the UID.

In a preferred embodiment of method 1200, the function of step 1210 appends the value of the indicator to that which is to be digitally signed such as, for example, an electronic message. In this case, the indicator may be communicated to the recipient of that which was digitally signed in order to verify the digital signature; however, the indicator need not be communicated if the recipient is aware of the possible values of the indicator and, therefore, can verify the digital signature by checking all possibilities. For example, the recipient of the electronic message and digital signature for the message—which in this case is the digital signature of both the message and the indicator appended thereto—can append the known different possible values of the indicator to the message in verifying the digital signature. One of the different possibilities should result in verification of the digital signature, provided that the message was not changed in transit and that the correct private key was used in generating the digital signature.

Figure 13:
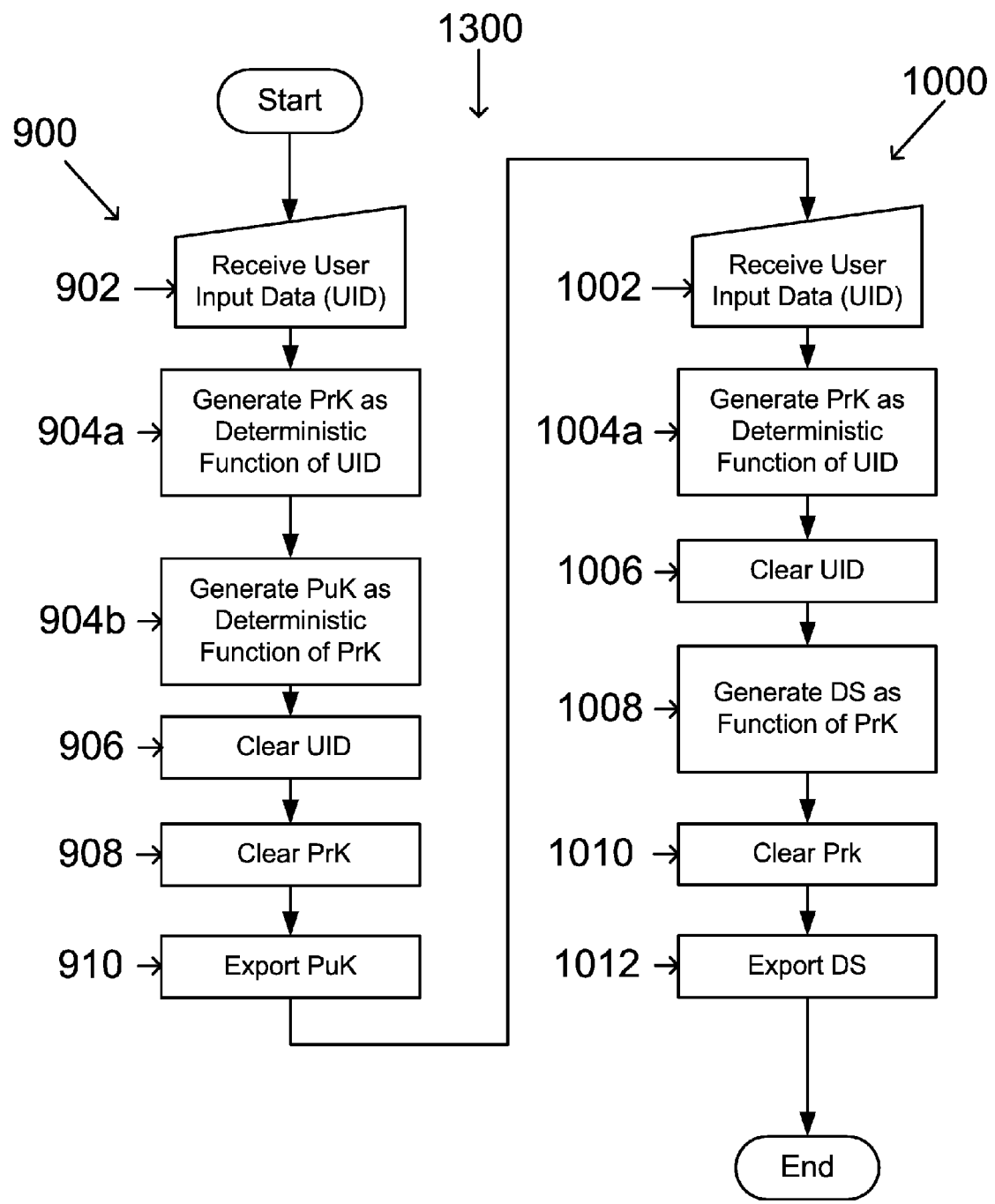
FIG. 13 illustrates a method 1300 for providing a public-private key pair and a digital signature in accordance with the present invention.

In some preferred embodiments, a public key is generated and exported from a computer system in accordance with an aspect of the present invention and, subsequent thereto, a digital signature is generated and exported from the computer system in accordance with an aspect of the present invention. The combination of these two methods is shown in method 1300 of FIG. 13. As will be immediately apparent from FIG. 13, method 1300 includes the combination of method 900 and method 1000, described above.

What is claimed is:

1. An invention comprising a method for facilitating communication using a digital signature, the method comprising the steps of:
 (a) first,
  (i) receiving into a first computer system input data from a first user, (ii) generating within the first computer system a first key as a deterministic function of said received data of said step (a)(i), (iii) following said step (a)(ii) of generating the first key, clearing said received data of said step (a)(i) so that said received data is no longer available within the first computer system for generating the first key within the first computer system, (iv) generating within the first computer system a second key as a deterministic function of said generated first key of said step (a)(ii), said generated first key comprising a private key of an asymmetric public-private key pair and said generated second key comprising a public key of the asymmetric public-private key pair, (v) following said step (a)(iv) of generating said second key, clearing said generated first key from the first computer system so that said generated first key is no longer available within the first computer system, and (vi) exporting said generated second key from the first computer system; and (b) thereafter, generating a digital signature by, (i) receiving into a second computer system input data from a second user, (ii) regenerating within the second computer system the first key using the deterministic function of said step (a)(ii) and said received data of said step (b)(i), (iii) following said step (b)(ii) of regenerating said first key, clearing from the second computer system said received data of said step (b)(i) so that said received data is no longer available within the second computer system for regenerating the first key within the second computer system, (iv) generating within the second computer system a digital signature as a function of said regenerated first key of said step (b)(ii), (v) following said step (b)(iv) of generating the digital signature, clearing said regenerated first key from the second computer system so that said regenerated first key is no longer available within the second computer system, and (vi) exporting said generated digital signature of said step (b)(iv) from the second computer.

2. The invention of claim 1, wherein neither said received data of said step (a)(i) nor said generated first key of said step (a)(ii) is exported from the first computer system.

3. The invention of claim 1, wherein neither said received data of said step (b)(i) nor said regenerated first key of said step (b)(ii) is exported from the second computer system.

4. The invention of claim 1, wherein, following said step (a)(iii) of clearing said received data from the first computer system, the user input data received in said step (a)(i) must be received again within the first computer system in order to regenerate the first key within the first computer system using the deterministic function of said step (a)(ii).

5. The invention of claim 1, wherein, following said step (b)(iii) of clearing said received data from the second computer system, the user input data received in said step (b)(i) must be received again within the second computer system in order to regenerate the first key within the second computer system using the deterministic function of said step (b)(ii).

6. The invention of claim 1, wherein the first computer system is the second computer system.

7. The invention of claim 1, wherein the first computer system is not the second computer system.

8. The invention of claim 1, wherein the first user is the second user.

9. The invention of claim 8, wherein the input data from the user represents a biometric.

10. The invention of claim 1, wherein the first user is not the second user.

11. The invention of claim 10, wherein the input data from both the first and second users represents a passphrase.

12. The invention of claim 10, wherein the input data from both the first and second users represents a password.

13. The invention of claim 10, wherein the input data from both the first and second users represents a PIN.

14. The invention of claim 1, wherein the function of said step (b)(iv) of generating the digital signature further is a function of whether a digital signature has yet been generated using said regenerated first key of said step (b)(ii).

15. The invention of claim 1, wherein said generated digital signature of said step (b)(iv) is for a message, and wherein the method further comprises communicating both said exported second key of said step (a)(vi) and said exported digital signature of said step (b)(vi) to a recipient of the message.

16. The invention of claim 1, wherein said step (a)(iii) of clearing said received data is performed prior to performance of said step (a)(iv) of generating the second key.

17. The invention of claim 1, wherein said step (a)(iii) of clearing said received data is performed after performance of said step (a)(iv) of generating the second key.

18. The invention of claim 1, wherein said step (b)(iii) of clearing said received data is performed prior to performance of said step (b)(iv) of generating the digital signature.

19. The invention of claim 1, wherein said step (b)(iii) of clearing said received data is performed after performance of said step (b)(iv) of generating the digital signature.

20. The invention of claim 1, wherein the deterministic function of said step (a)(ii) outputs a large integer value.

21. The invention of claim 1, wherein the deterministic function of said step (a)(ii) comprises hashing said received data of said step (a)(i).

22. The invention of claim 21, wherein the deterministic function of said step (a)(ii) comprises hashing multiple times said received data of said step (a)(i).

23. The invention of claim 21, wherein the deterministic function of said step (a)(ii) comprises hashing multiple times said received data of said step (a)(i) while folding interim hashes together.

24. The invention of claim 1, wherein the deterministic function of said step (a)(ii) comprises a strong hash function.

25. The method of claim 1, wherein said step (b)(iv) of generating the digital signature utilizes an elliptical curve digital signature algorithm (ECDSA).

26. The invention of claim 1, wherein the method further comprises, prior to said step (a)(ii) of generating the first key, the step of receiving elliptical curve parameters.

27. The invention of claim 26, wherein said received elliptical curve parameters define an elliptical curve over a finite field.

28. The invention of claim 1, further comprising the steps of, prior to said step (a)(ii) of generating the first key,
receiving elliptical curve parameters defining an elliptical curve over a finite field, and
receiving a generating point on the elliptical curve defined by said received elliptical curve parameters.

29. The invention of claim 1, wherein said step (a)(iii) of clearing said received data of said step (a)(i) occurs upon performance of said step (a)(ii) of generating the first key.

30. The invention of claim 1, wherein said step (a)(iii) of clearing said received data of said step (a)(i) occurs immediately upon performance of said step (a)(ii) of generating the first key.

31. The invention of claim 1, wherein said step (b)(iii) of clearing said received data of said step (b)(i) occurs upon performance of said step (b)(ii) of regenerating the first key.

32. The invention of claim 1, wherein said step (b)(iii) of clearing said received data of said step (b)(i) occurs immediately upon performance of said step (b)(ii) of regenerating the first key.

33. The invention of claim 1, wherein said step (a)(v) of clearing said generated first key occurs upon performance of said step (a)(iv) of generating the second key.

34. The invention of claim 1, wherein said step (a)(v) of clearing said generated first key occurs immediately upon performance of said step (a)(iv) of generating the second key.

35. The invention of claim 1, wherein said step (b)(v) of clearing said regenerated first key occurs upon performance of said step (b)(iv) of generating the digital signature.

36. The invention of claim 1, wherein said step (b)(v) of clearing said regenerated first key occurs immediately upon performance of said step (b)(iv) of generating the digital signature.

37. The invention of claim 1, wherein said step (b)(v) of clearing said regenerated first key occurs following expiration of a predetermined period of time.

38. The invention of claim 1, wherein said step (b)(v) of clearing said regenerated first key occurs immediately upon expiration of a predetermined period of time.

39. The invention of claim 38, wherein the predetermined period of time comprises the time period in which a predetermined number of digital signatures are generated using said regenerated first key.

40. The invention of claim 38, wherein the predetermined period of time comprises the time period beginning with said step (b)(ii) of regenerating the first key, and ending with the termination of a communications session of the second computer system.

41. The invention of claim 38, wherein said step (b)(iv) of generating the digital signature is performed in response to a digital signature request from a program, and wherein the predetermined period of time comprises the time period beginning with said step (b)(iv) of regenerating the first key and ending with a subsequent digital signature request from a different program.

42. The invention of claim 38, wherein the predetermined period of time consists of a predetermined fixed amount of time.

43. The invention of claim 1, wherein said steps of clearing each comprises overwriting data.

44. The invention method of claim 43, wherein said overwriting comprises wiping.

45. The invention of claim 43, wherein said overwriting comprises writing pseudo random bit strings.

46. The invention of claim 1, further comprising a computer-readable medium having computer-executable instructions for performing the method.

* * * * *